(12) United States Patent
Mihara et al.

(10) Patent No.: US 8,716,361 B2
(45) Date of Patent: May 6, 2014

(54) CURABLE FLUORINE-CONTAINING RESIN AND ACTIVE-ENERGY-RAY-CURABLE COMPOSITION INCLUDING THE SAME

(75) Inventors: Takashi Mihara, Ichihara (JP); Hideya Suzuki, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/635,372

(22) PCT Filed: Mar. 22, 2011

(86) PCT No.: PCT/JP2011/056727
§ 371 (c)(1),
(2), (4) Date: Sep. 14, 2012

(87) PCT Pub. No.: WO2011/122391
PCT Pub. Date: Oct. 6, 2011

(65) Prior Publication Data
US 2013/0012647 A1    Jan. 10, 2013

(30) Foreign Application Priority Data
Mar. 31, 2010   (JP) ................................ 2010-081973

(51) Int. Cl.
*C08J 3/28* (2006.01)
*C08F 2/46* (2006.01)
*C08G 61/04* (2006.01)

(52) U.S. Cl.
USPC ............... 522/116; 522/114; 522/113; 522/1; 520/1

(58) Field of Classification Search
USPC ........................ 522/116, 114, 113, 1; 520/1
See application file for complete search history.

(56) References Cited

U.S. PATENT DOCUMENTS 6,160,030 A * 12/2000 Chaouk et al. ................. 521/145
8,030,412 B2 * 10/2011 Suzuki et al. ............... 525/326.2

FOREIGN PATENT DOCUMENTS

| JP | 11-166150 A | 6/1999 |
| JP | 2005-519146 A | 6/2005 |
| JP | 2005-538417 A | 12/2005 |
| JP | 2007-246696 A | 9/2007 |
| JP | 2009-132820 A | 6/2009 |
| JP | 2009-256597 A | 11/2009 |
| WO | WO-03/002628 A1 | 1/2003 |
| WO | WO 2009/133770 | * 11/2009 |
| WO | WO-2009/133770 A1 | 11/2009 |
| WO | WO-2010/016452 A1 | 2/2010 |

OTHER PUBLICATIONS

International Search Report dated Apr. 26, 2011, issued for PCT/JP2011/056727.

* cited by examiner

*Primary Examiner* — Ling Choi
*Assistant Examiner* — Jessica E Whiteley
(74) *Attorney, Agent, or Firm* — Edwards Wildman Palmer LLP

(57) ABSTRACT

Provided is a curable fluorine-containing resin produced by causing a reaction between a polymer (P) and a compound (C); the polymer (P) being prepared by copolymerization in which essential monomer components are a compound (A) having a poly(perfluoroalkylene ether) chain and styryl groups at both ends of the poly(perfluoroalkylene ether) chain and a polymerizable unsaturated monomer (B) having at least one functional group (b) selected from the group consisting of a hydroxy group, an isocyanate group, an epoxy group, a carboxyl group, an acid anhydride group, and a carboxylic acid halide group; the compound (C) having a polymerizable unsaturated group and at least one functional group (c) that has reactivity with the functional group (b) and is selected from the group consisting of a hydroxy group, an isocyanate group, an epoxy group, a carboxyl group, an acid anhydride group, and a carboxylic acid halide group.

6 Claims, 3 Drawing Sheets

CURABLE FLUORINE-CONTAINING RESIN AND ACTIVE-ENERGY-RAY-CURABLE COMPOSITION INCLUDING THE SAME

TECHNICAL FIELD

The present invention relates to a curable fluorine-containing resin that is used as a fluorine-containing surfactant or a fluorine-containing surface modifier that can impart high antifouling properties to the surfaces of cured coating films. The present invention also relates to an active-energy-ray-curable composition including the curable fluorine-containing resin, a cured product of the foregoing, and an article including a cured coating film formed from the foregoing.

BACKGROUND ART

Fluorine-containing surfactants and fluorine-containing surface modifiers are excellent in, for example, leveling properties, wettability, penetrability, anti-blocking properties, slipping properties, water-oil repellency, and antifouling properties and hence are widely used for various coating materials, surface modifiers, and the like.

A cured coating film produced by applying and curing an active-energy-ray-curable coating material containing a fluorine-containing surfactant or a fluorine-containing surface modifier (hereafter, these are collectively referred to as just "fluorine-containing surfactant") exhibits excellent antifouling properties. However, there is a problem that the antifouling properties of the surface of the cured coating film are degraded because the fluorine-containing surfactant is partially separated or evaporated from the surface of the cured coating film, during production steps of the cured coating film, by heating, wetting, exposure to a chemical agent such as an acid or an alkali, cleaning and wiping for removing fouling, or the like.

Specifically, for example, in the field of surface-treatment agents for protective films such as triacetylcellulose (hereafter, abbreviated as "TAC") films in polarizing plates for liquid-crystal displays, to impart antifouling properties against fingerprints and fouling to the surfaces of films, the surfaces of the protective films are coated with ultraviolet-curable hard coating materials containing fluorine-containing surfactants and the like. However, in such a protective film, another surface with respect to the hard coating surface formed by application of a hard coating material is subjected to a saponification treatment (alkali treatment) for the purpose of imparting adhesion properties to the other surface. Accordingly, at this time, the alkali solution unavoidably comes into contact with the hard coating surface. The strong alkali solution washes off or decomposes a fluorine-containing surfactant and the like present in the hard coating surface. Thus, the fluorine-containing surfactant and the like are separated from the hard coating surface and antifouling properties are degraded, which has been problematic.

Accordingly, a fluorine-containing surfactant that can withstand a saponification treatment has been proposed: the surfactant has a polymerizable functional group and is fixed in a cured coating film as a result of polymerization with another material. For example, a polymerizable fluorine-containing surfactant having an unsaturated group has been proposed, the surfactant being produced by copolymerizing a monoacrylate having a fluorinated alkyl group and an acrylic-based monomer having an active hydrogen and by subsequently causing the resultant polymer to react with an acrylic-based monomer having an isocyanate group (for example, refer to Patent Literature 1). This polymerizable fluorine-containing surfactant has a polymerizable group. When this surfactant is used as an additive to an active-energy-ray-curable composition, the surfactant forms covalent bonds with a polymerizable component in the composition and is fixed in the coating film. However, there is a problem that the antifouling properties are considerably degraded after a saponification treatment.

In addition, as with the above-described polymerizable fluorine-containing surfactant, a polymerizable fluorine-containing surfactant having a poly(perfluoroalkylene ether) chain and an unsaturated group has been proposed, the surfactant being produced from a material that is a compound having a (perfluoroalkylene ether) chain and di(meth)acryloyl groups at both ends of the chain (for example, refer to Patent Literature 2). Although the fluorine-containing surfactant having a poly(perfluoroalkylene ether) chain has high antifouling properties after a saponification treatment with respect to the surfactant described in Patent Literature 1, it does not satisfy antifouling requirements on a still higher level.

Accordingly, a material that maintains its very high antifouling properties even after being subjected to a saponification treatment has been demanded.

CITATION LIST

Patent Literature

PTL 1: Japanese Unexamined Patent Application Publication No. 2007-246696
PTL 2: International Publication No. WO2009/133770

SUMMARY OF INVENTION

Technical Problem

An object of the present invention is to provide a curable fluorine-containing resin used as a fluorine-containing surfactant that can impart excellent antifouling properties to the surface of a cured coating film; an active-energy-ray-curable composition in which, after the composition is applied, cured, and then even subjected to a saponification treatment, separation of the fluorine-containing surfactant from the surface of the cured coating film can be suppressed and excellent antifouling properties can be imparted; a cured product of the foregoing; and an article including a cured coating film formed from the foregoing.

Solution to Problem

The inventors of the present invention performed thorough studies on how to achieve the object. As a result, the inventors have found that an active-energy-ray-curable composition including a curable fluorine-containing resin can provide a cured coating film in which the antifouling properties of the surface are high and degradation of the antifouling properties caused by a saponification treatment can be suppressed, the curable fluorine-containing resin being produced by causing a reaction between a polymer and a compound, the polymer being prepared by copolymerization of a compound having a poly(perfluoroalkylene ether) chain and styryl groups at both ends of the poly(perfluoroalkylene ether) chain and a polymerizable unsaturated monomer having a reactive functional group, the compound having a polymerizable unsaturated group and a functional group that has reactivity with the reactive functional group. Thus, the present invention has been accomplished.

Specifically, the present invention relates to a curable fluorine-containing resin produced by causing a reaction between a polymer (P) and a compound (C); the polymer (P) being prepared by copolymerization in which essential monomer components are a compound. (A) having a poly(perfluoroalkylene ether) chain and styryl groups at both ends of the poly(perfluoroalkylene ether) chain and a polymerizable unsaturated monomer (B) having at least one functional group (b) selected from the group consisting of a hydroxy group, an isocyanate group, an epoxy group, a carboxyl group, an acid anhydride group, and a carboxylic acid halide group; the compound (C) having a polymerizable unsaturated group and at least one functional group (c) that has reactivity with the functional group (b) and is selected from the group consisting of a hydroxy group, an isocyanate group, an epoxy group, a carboxyl group, an acid anhydride group, and a carboxylic acid halide group. The present invention also relates to an active-energy-ray-curable composition containing the curable fluorine-containing resin.

The present invention also relates to a cured product produced by applying the curable fluorine-containing resin or the active-energy-ray-curable composition to a base material and curing the applied resin or composition through irradiation with an active energy ray; and an article including a cured coating film formed from the curable fluorine-containing resin or the active-energy-ray-curable composition.

Advantageous Effects of Invention

By forming a cured coating film through application of a curable fluorine-containing resin according to the present invention alone to a base material, antifouling properties can be imparted to the surface of the base material. When an active-energy-ray-curable composition containing the curable fluorine-containing resin as a fluorine-containing surfactant is applied to a base material, the curable fluorine-containing resin segregates in the surface of the coating film due to the polar difference between the fluorine atom and other atoms. Accordingly, surface modification that imparts, for example, antifouling properties to the surface of the coating film only can be performed. In addition, the curable fluorine-containing resin is polymerizable with another curable component in the active-energy-ray-curable composition. Accordingly, a curable fluorine-containing resin according to the present invention is further strongly fixed in the cured coating film. Thus, even when a heat treatment or the like is performed, evaporation or separation of the curable fluorine-containing resin or decomposition matter of the resin from the surface of the cured coating film can be suppressed.

A cured coating film formed from a curable fluorine-containing resin according to the present invention has high resistance to a saponification treatment. Even when the cured coating film is subjected to a saponification treatment, degradation of the antifouling properties can be suppressed. Accordingly, an active-energy-ray-curable composition including a curable fluorine-containing resin according to the present invention is very useful as a hard coating material for TAC films that need to have antifouling properties, are used for polarizing plates for liquid-crystal displays, and are subjected to saponification treatments using alkalis.

DESCRIPTION OF EMBODIMENTS

Figure 1:
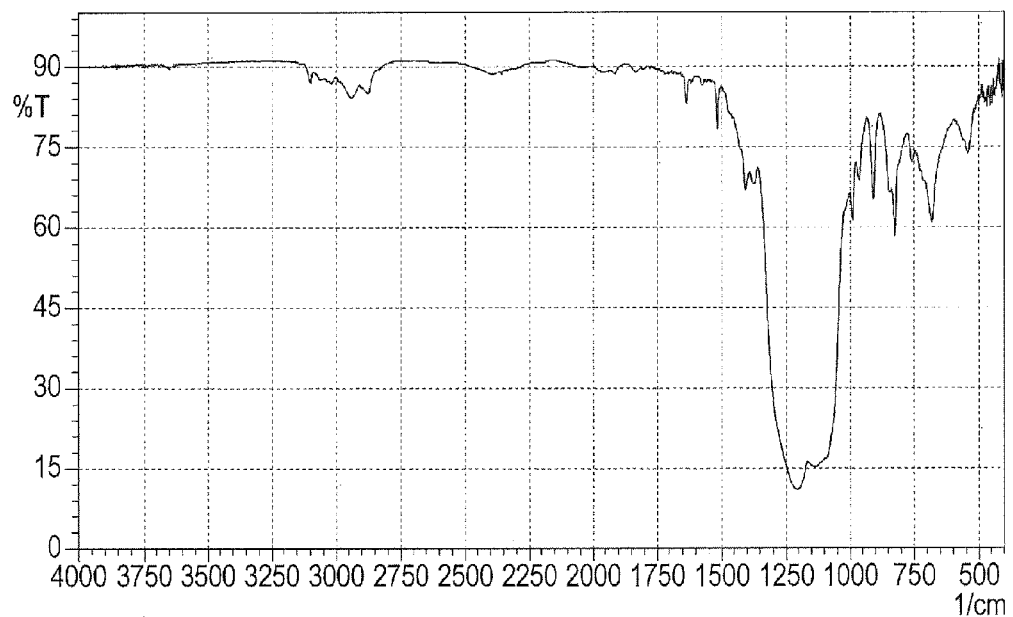
FIG. 1 is an IR spectrum chart of a compound obtained in Synthesis example 1 and having a poly(perfluoroalkylene ether) chain and styryl groups at both ends of the chain.

A curable fluorine-containing resin according to the present invention is produced by causing a reaction between a polymer (P) and a compound (C); the polymer (P) being prepared by copolymerization in which essential monomer components are a compound (A) having a poly(perfluoroalkylene ether) chain and styryl groups at both ends of the poly(perfluoroalkylene ether) chain and a polymerizable unsaturated monomer (B) having at least one functional group (b) selected from the group consisting of a hydroxy group, an isocyanate group, an epoxy group, a carboxyl group, an acid anhydride group, and a carboxylic acid halide group; the compound (C) having a polymerizable unsaturated group and at least one functional group (c) that has reactivity with the functional group (b) and is selected from the group consisting of a hydroxy group, an isocyanate group, an epoxy group, a carboxyl group, an acid anhydride group, and a carboxylic acid halide group.

Hereinafter, the compound (A) having a poly(perfluoroalkylene ether) chain and styryl groups at both ends of the chain, the compound (A) serving as a starting material of a curable fluorine-containing resin according to the present invention, will be described.

The poly(perfluoroalkylene ether) chain of the compound (A) may have a structure in which a divalent fluorinated carbon group having 1 to 3 carbon atoms and an oxygen atom are alternately bonded. The divalent fluorinated carbon group having 1 to 3 carbon atoms may be a group of a single type or a combination of groups of two or more types. Specifically, such a group may be represented by the following structural formula (a1).

[Chem. 1]

(In the structural formula (a), X represents structural formulae (a1-1) to (a1-5) below; in the structural formula (a1), all X's may have the same structure or a plurality of structures may be present on a random basis or in blocks; n is an integer of 1 or more and represents the repeating unit.)

[Chem. 2]

  (a1-1)

  (a1-2)

  (a1-3)

-continued

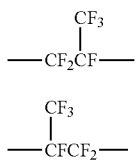

(a1-4)

(a1-5)

Of these, a combination of a perfluoromethylene structure represented by the structural formula (a1-1) and a perfluoroethylene structure represented by the structural formula (a1-2) is particularly preferred because a coating film that facilitates wiping off of fouling from the surface of the coating film and has excellent antifouling properties is provided. Herein, as for the existence ratio of the perfluoromethylene structure represented by the structural formula (a1-1) and the perfluoroethylene structure represented by the structural formula (a1-2), the molar ratio [structure (a1-1)/structure (a1-2)] is preferably 1/10 to 10/1 in view of antifouling properties. In addition, n in the structural formula (a1) is preferably in the range of 3 to 100, more preferably in the range of 6 to 70.

The compound (A) can be obtained by, for example, causing a compound (a2) having a poly(perfluoroalkylene ether) chain and hydroxy groups at both ends of the chain to react with a styrene (a3) having a functional group having reactivity with hydroxy groups such as an alkyl halide group or an isocyanate group. Examples of the compound (a2) include general formulae (a2-1) and (a2-2) below. In the following structural formulae, "-PFPE-" represents the poly(perfluoroalkylene ether) chain.

[Chem. 3]

(a2-1)

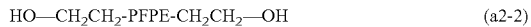

(a2-2)

The halogen atom of the alkyl halide group of the styrene (a3) may be a chlorine atom, a bromine atom, or an iodine atom. The alkyl group preferably has 1 to 6 carbon atoms and may be linear or branched. Of such alkyl halide groups, a chloromethyl group is preferred in view of reactivity with the compound (a2) and ease of availability.

The styrene (a3) may have, on the aromatic ring, a substituent other than the vinyl group and the functional group having reactivity with hydroxy groups such as an alkyl halide group or an isocyanate group. The positional relationship between the vinyl group and the functional group having reactivity with hydroxy groups such as an alkyl halide group or an isocyanate group may be any one of the ortho position, the meta position, and the para position; the para position is preferred because high polymerization properties are provided in the production of the polymer (P) described below.

Hereinafter, as an example of a method for producing the compound (A), a method of causing a compound (a2) having a poly(perfluoroalkylene ether) chain and hydroxy groups at both ends of the chain to react with a styrene (a3) having an alkyl halide group will be described.

The compound (A) can be obtained by forming a uniform solution of the compound (a2) having a poly(perfluoroalkylene ether) chain and hydroxy groups at both ends of the chain and the styrene (a3) having an alkyl halide group in the presence or absence of solvent, optionally adding a catalyst to the solution, and dropping a base into the solution at an appropriate temperature to cause a reaction.

The solvent used in the reaction between the compound (a2) and the styrene (a3) may be a polar solvent or a two-phase solvent having an organic phase and an aqueous phase. Examples of the polar solvent include benzene, toluene, diethyl ether, tetrahydrofuran, diisopropyl ether, dimethyl sulfoxide, 1,3-bis(trifluoromethyl)benzene, and 1,4-bis(trifluoromethyl)benzene. Examples of a solvent used for the organic phase include benzene, toluene, diethyl ether, diisopropyl ether, cyclohexane, 1,3-bis(trifluoromethyl)benzene, 1,4-bis(trifluoromethyl)benzene, and dimethyl sulfoxide.

Examples of the base used in the production of the compound (A) include alkali-metal hydroxides such as sodium hydroxide and potassium hydroxide; alkali-metal hydrides such as sodium hydride and potassium hydride; alkali metals such as lithium, sodium, and potassium; and amines such as triethylamine. Such a base may be used in the form of an aqueous solution having an appropriate concentration. The amount of the base used is preferably in the range of 1.05 to 5 mol % with respect to the hydroxy groups of the compound (a2) having a poly(perfluoroalkylene ether) chain and hydroxy groups at both ends of the chain.

Examples of the catalyst used in the production of the compound (A) include various onium salts: quaternary ammonium compounds such as tetra-n-butylammonium bromide, tetra-n-butylammonium hydrogen sulfate, benzyltrimethylammonium chloride, and tricaprylmethylammonium chloride; quaternary phosphonium compounds such as tetra-n-butylphosphonium bromide, benzyltriphenylphosphonium chloride, tetraphenylphosphonium chloride, and tetraphenylphosphonium bromide; and tertiary sulfonium compounds such as benzyltetramethylenesulfonium bromide. These catalysts may be used alone or in combination of two or more thereof. The amount of the catalyst used is preferably in the range of 1 to 50 mol %, more preferably in the range of 3 to 30 mol %, with respect to the amount of the styrene (a3).

The reaction temperature is preferably in the range of 0° C. to 150° C. To suppress polymerization reactions of starting materials and the product, the reaction temperature is preferably 80° C. or less in the presence of a polymerization inhibitor. Examples of the polymerization inhibitor include phenol-based polymerization inhibitors such as p-methoxyphenol and 2,4-dimethyl-6-t-butylphenol; and metal carbamate-based polymerization inhibitors such as copper dimethyldithiocarbamate. These polymerization inhibitors may be used alone or in combination of two or more thereof. The amount of the polymerization inhibitor used is preferably in the range of 10 to 1,000 ppm with respect to the total amount of the compound (a2) having a poly(perfluoroalkylene ether) chain and hydroxy groups at both ends of the chain and the styrene (a3) having an alkyl halide group.

As for the reaction end point, for example, the time when the peaks derived from hydroxy groups of the compound (a2) in IR spectroscopy or $^1$H-NMR spectroscopy has disappeared is regarded as the reaction end. The reaction time is generally preferably in the range of 2 to 50 hours.

The compound (A) produced by the above-described production method can be obtained in high yield and at high purity by, for example, removing generated salts, removing the solvent used, or collecting unreacted starting materials performed by a publicly known collection and purification process. For example, generated salts are separated by filtration from the reaction solution and the filtrate is then rinsed with water and separated to isolate the product. The isolated product is then washed with an organic solvent such as methanol, separated to isolate the product, and then concentrated through evaporation of the remaining organic solvent. Thus, the target product can be easily obtained.

Specific examples of the compound (A) include general formulae (A-1) to (A-4) below. The compound (A) may be constituted by a combination of two or more compounds that have differences in the length of the poly(perfluoroalkylene ether) chain or the type of the divalent organic group connecting the poly(perfluoroalkylene ether) chain and a styryl group.

lene glycol mono(meth)acrylate, 2-hydroxy-3-phenoxypropyl (meth)acrylate, 2-(meth)acryloyloxyethyl-2-hydroxyethyl phthalate, and lactone-modified (meth)acrylate having an end hydroxy group; unsaturated monomers having

[Chem. 4]

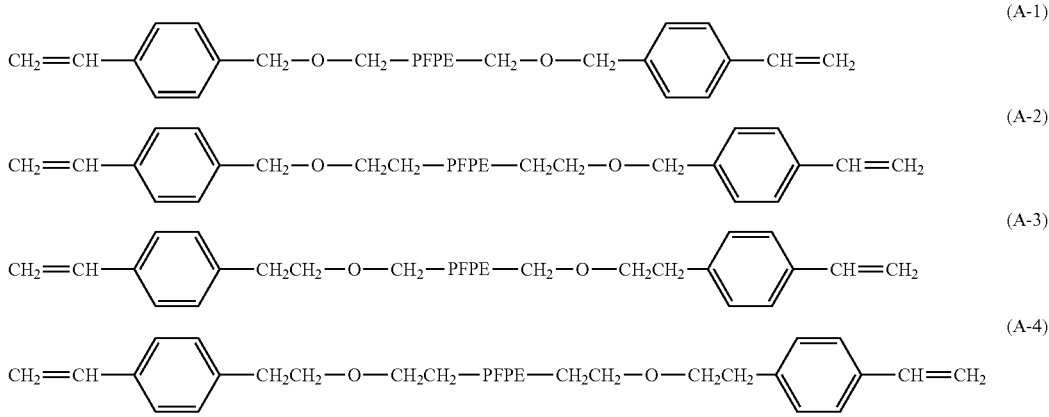

Hereinafter, the polymerizable unsaturated monomer (B) having the reactive functional group (b) and serving as a starting material of a curable fluorine-containing resin according to the present invention will be described.

The polymerizable unsaturated monomer (B) can be easily turned into a polymer having a high molecular weight by a standard radical polymerization method. In this case, the reaction may be conducted by a publicly known process such as block polymerization, solution polymerization, suspension polymerization, or emulsion polymerization. Although a radical polymerization reaction may be caused by simple heating or ultraviolet radiation, it can be quickly initiated by the addition of a radical initiator.

The functional group (b) of the polymerizable unsaturated monomer (B) is at least one selected from the group consisting of a hydroxy group, an isocyanate group, an epoxy group, a carboxyl group, an acid anhydride group, and a carboxylic acid halide group. The polymerizable unsaturated monomer (B) having such a functional group (b) may be a single polymerizable unsaturated monomer (B) having a functional group (b) of a single type or a combination of two or more polymerizable unsaturated monomers (B) having different functional groups (b). The polymerizable unsaturated group of the monomer (B) is preferably a radical polymerizable carbon-carbon unsaturated double bond: specifically, a vinyl group, a (meth)acryloyl group, a maleimide group, or the like; more preferably a (meth)acryloyl group because polymerization is easily achieved.

Note that, in the present invention, "(meth)acrylate" denotes one or both of methacrylate and acrylate; "(meth) acryloyl group" denotes one or both of a methacryloyl group and an acryloyl group; and "(meth)acrylic acid" denotes one or both of methacrylic acid and acrylic acid.

Specific examples of the polymerizable unsaturated monomer (B) include: unsaturated monomers having a hydroxy group such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 1,4-cyclohexanedimethanol mono(meth)acrylate, N-(2-hydroxyethyl) (meth)acrylamide, glycerin mono(meth)acrylate, polyethylene glycol mono(meth)acrylate, polypropyan isocyanate group such as 2-(meth)acryloyloxyethyl isocyanate, 2-(2-(meth)acryloyloxyethoxy)ethyl isocyanate, and 1,1-bis((meth)acryloyloxymethyl)ethyl isocyanate; unsaturated monomers having an epoxy group such as glycidyl (meth)acrylate and 4-hydroxybutyl (meth)acrylate glycidyl ether; unsaturated monomers having a carboxyl group such as (meth)acrylic acid, 2-(meth)acryloyloxyethylsuccinic acid, 2-(meth)acryloyloxyethylphthalic acid, maleic acid, and itaconic acid; unsaturated monomers having an acid anhydride group such as maleic anhydride and itaconic anhydride; and unsaturated monomers having a carboxylic acid halide group such as (meth)acrylic acid chloride and (meth)acrylic acid bromide.

In the production of the polymer (P), in addition to the compound (A) and the monomer (B), another polymerizable unsaturated monomer that is copolymerizable with the compound (A) and the monomer (B) may be used. Examples of such another radical polymerizable unsaturated monomer include: (meth)acrylic acid esters such as methyl (meth)acrylate, ethyl (meth)acrylate, n-propyl (meth)acrylate, n-butyl (meth)acrylate, isobutyl (meth)acrylate, n-pentyl (meth) acrylate, n-hexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, cyclohexyl (meth)acrylate, and isobornyl (meth)acrylate; aromatic vinyls such as styrene, α-methyl styrene, p-methyl styrene, and p-methoxy styrene; and maleimides such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide.

The polymer (P) may be produced by a method in which the compound (A), the monomer (B), and optionally another polymerizable unsaturated monomer are copolymerized in an organic solvent in the presence of a radical polymerization initiator. Preferred examples of the organic solvent used herein include ketones, esters, amides, sulfoxides, ethers, hydrocarbons, and fluorine-based solvents: specifically, acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethyl sulfoxide, diethyl ether, diisopropyl ether, tetrahydrofuran, dioxane, toluene, xylene, 1,3-bis(trifluoromethyl)benzene, and 1,4-bis(trifluoromethyl)benzene. Such an organic solvent is appropriately selected in accordance with the boiling point, compatibility with the starting materials or the polymer, and polymerization properties. The compound (A) has very high compatibility with organic solvents and substantially dissolves in the above-described organic solvents.

Examples of the radical polymerization initiator include peroxides such as acetyl peroxide, cumyl peroxide, t-butyl peroxide, propionyl peroxide, benzoyl peroxide, 2-chlorobenzoyl peroxide, 3-chlorobenzoyl peroxide, 4-chlorobenzoyl peroxide, 2,4-dichlorobenzoyl peroxide, 4-bromomethylbenzoyl peroxide, lauroyl peroxide, diisopropyl peroxycarbonate, tetralin hydroperoxide, 1-phenyl-2-methylpropyl-1-hydroperoxide, t-butyl pertriphenylacetate, t-butyl hydroperoxide, t-butyl performate, t-butyl peracetate, t-butyl perbenzoate, t-butyl per-2-ethyl hexanoate, t-butyl perphenylacetate, and t-butyl per-4-methoxyacetate; and azo compounds such as 2,2'-dichloro-2,2'-azobispropane, 1,1'-azo(methylethyl)diacetate, 2,2'-azobis(2-amidinopropane) nitrate, 2,2'-azobisisobutane, 2,2'-azobisisobutylamide, 2,2'-azobisisobutyronitrile, methyl 2,2'-azobis-2-methylpropionate, 2,2'-dichloro-2,2'-azobisbutane, 2,2'-azobis-2-methylbutyronitrile, dimethyl 2,2'-azobisisobutyrate, dimethyl 2,2'-azobisisobutyrate, 2-(4-methylphenylazo)-2-methylmalonodinitrile, 4,4'-azobis-4-cyanovalerate, 3,5-dihydroxymethylphenylazo-2-methylmalonodinitrile, 1,1'-azobis-1-cyclohexanecarbonitrile, 1,1'-azobis-1-phenylethane, 1,1'-azobiscumene, ethyl 4-nitrophenylazobenzylcyanoacetate, phenylazodiphenylmethane, phenylazotriphenylmethane, 4-nitrotriphenylazotriphenylmethane, and 1,1'-azobis-1,2-diphenylethane. If necessary, a chain transfer agent such as lauryl mercaptan, 2-mercaptoethanol, thioglycerol, ethylthioglycolic acid, and octylthioglycolic acid may also be used.

The polymer (P) obtained as described above is made to react with the compound (C) having a polymerizable unsaturated group and a functional group (c) that has reactivity with the functional group (b) to thereby provide a curable fluorine-containing resin according to the present invention.

The functional group (c) of the compound (C) has reactivity with the functional group (b) and is at least one selected from the group consisting of a hydroxy group, an isocyanate group, an epoxy group, a carboxyl group, and a carboxylic acid halide group. When the functional group (b) is a hydroxy group, the functional group (c) may be an isocyanate group, an epoxy group, a carboxyl group, an acid anhydride group, or a carboxylic acid halide group. When the functional group (b) is an isocyanate group, the functional group-(c) may be a hydroxy group. When the functional group (b) is an epoxy group, the functional group (c) may be a hydroxy group, a carboxyl group, or an acid anhydride group. When the functional group (b) is a carboxyl group, the functional group (c) may be a hydroxy group or an epoxy group. When the functional group (b) is a carboxylic acid halide group, the functional group (c) may be a hydroxy group. In such cases, a plurality of functional groups may be combined unless the reaction is hindered.

Specific examples of the compound (C) include: unsaturated monomers having a hydroxy group such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 1,4-cyclohexanedimethanol mono(meth)acrylate, N-(2-hydroxyethyl) (meth)acrylamide, glycerin mono(meth)acrylate, polyethylene glycol mono (meth)acrylate, polypropylene glycol mono(meth)acrylate, 2-hydroxy-3-phenoxypropyl (meth)acrylate, 2-(meth)acryloyloxyethyl-2-hydroxyethyl phthalate, and lactone-modified (meth)acrylate having an end hydroxy group; unsaturated monomers having an isocyanate group such as 2-(meth) acryloyloxyethyl isocyanate, 2-(2-(meth)acryloyloxyethoxy) ethyl isocyanate, and 1,1-bis((meth)acryloyloxymethyl)ethyl isocyanate; unsaturated monomers having an epoxy group such as glycidyl (meth)acrylate and 4-hydroxybutyl (meth) acrylate glycidyl ether; unsaturated monomers having a carboxyl group such as (meth)acrylic acid, 2-(meth)acryloyloxyethylsuccinic acid, 2-(meth)acryloyloxyethylphthalic acid, maleic acid, and itaconic acid; unsaturated monomers having an acid anhydride group such as maleic anhydride and itaconic anhydride; and unsaturated monomers having a carboxylic acid halide group such as (meth)acrylic acid chloride and (meth)acrylic acid bromide. An unsaturated monomer having a hydroxy group and a plurality of polymerizable unsaturated groups may be used such as 2-hydroxy-3-acryloyloxypropyl methacrylate, pentaerythritol triacrylate, or dipentaerythritol pentaacrylate.

Of these, in view of desired polymerization curability by ultraviolet radiation, preferred are 2-hydroxyethyl acrylate, 2-hydroxypropyl acrylate, 3-hydroxypropyl acrylate, 2-hydroxybutyl acrylate, 4-hydroxybutyl acrylate, 1,4-cyclohexanedimethanol monoacrylate, N-(2-hydroxyethyl)acrylamide, 2-acryloyloxyethyl isocyanate, 4-hydroxybutyl acrylate glycidyl ether, and acrylic acid.

The process of making the polymer (P) react with the compound (C) having a polymerizable unsaturated group and a functional group (c) that has reactivity with the functional group (b) is performed under conditions such that the polymerizable unsaturated group in the compound (C) is not polymerized: for example, the reaction is preferably caused under a temperature condition adjusted to be a range of 30° C. to 120° C. The reaction is preferably performed in the presence of a catalyst and a polymerization inhibitor, optionally, in the presence of an organic solvent.

For example, when the functional group (b) is a hydroxy group and the functional group (c) is an isocyanate group, or the functional group (b) is an isocyanate group and the functional group (c) is a hydroxy group, a preferred reaction process is performed such that a polymerization inhibitor is, for example, p-methoxyphenol, hydroquinone, or 2,6-di-t-butyl-4-methylphenol; a urethane-forming reaction catalyst is, for example, dibutyl tin dilaurate, dibutyl tin diacetate, tin octylate, or zinc octylate; and the reaction temperature is in the range of 20° C. to 150° C., in particular, in the range of 40° C. to 120° C. Alternatively, when the functional group (b) is an epoxy group and the functional group (c) is a carboxyl group, or the functional group (b) is a carboxyl group and the functional group (c) is an epoxy group, the reaction is preferably caused such that a polymerization inhibitor is, for example, p-methoxyphenol, hydroquinone, or 2,6-di-t-butyl-4-methylphenol; an esterification reaction catalyst is, for example, a tertiary amine such as triethylamine, a quaternary ammonium such as tetramethylammonium chloride, a tertiary phosphine such as triphenylphosphine, or a quaternary phosphonium such as tetrabutylphosphonium chloride; and the reaction temperature is in the range of 80° C. to 130° C., in particular, in the range of 100° C. to 120° C.

Preferred examples of the organic solvent used in the reaction include ketones, esters, amides, sulfoxides, ethers, hydrocarbons, and fluorine-based solvents: specifically, acetone, methyl ethyl ketone, methyl isobutyl ketone, cyclohexanone, ethyl acetate, butyl acetate, propylene glycol monomethyl ether acetate, dimethylformamide, dimethylacetamide, N-methylpyrrolidone, dimethyl sulfoxide, diethyl ether, diisopropyl ether, tetrahydrofuran, dioxane, toluene, xylene, 1,3-bis(trifluoromethyl)benzene, and 1,4-bis(trifluoromethyl)benzene. These may be appropriately selected in accordance with the boiling point and compatibility.

To suppress gelation at the time of production and to impart excellent antifouling properties to a cured coating film, a curable fluorine-containing resin according to the present invention obtained as described above preferably has a number-average molecular weight (Mn) in the range of 1,000 to 20,000, more preferably, in the range of 1,500 to 10,000; and a weight-average molecular weight (Mw) in the range of 3,000 to 80,000, preferably in the range of 4,000 to 50,000.

Herein, the number-average molecular weight (Mn) and the weight-average molecular weight (Mw) are calculated in terms of polystyrene on the basis of measurements by gel permeation chromatography (hereafter, abbreviated as "GPC"). The GPC measurement conditions are as follows.

[GPC Measurement Conditions]
Measurement apparatus: "HLC-8220 GPC" manufactured by Tosoh Corporation
Columns: guard column "HHR-H" (6.0 mm I.D.×4 cm) manufactured by Tosoh Corporation
+"TSK-GEL GMHHR-N" (7.8 mm I.D.×30 cm) manufactured by Tosoh Corporation
+"TSK-GEL GMHHR-N" (7.8 mm I.D.×30 cm) manufactured by Tosoh Corporation
+"TSK-GEL GMHHR-N" (7.8 mm I.D.×30 cm) manufactured by Tosoh Corporation
+"TSK-GEL GMHHR-N" (7.8 mm I.D.×30 cm) manufactured by Tosoh Corporation
Detector: ELSD ("ELSD2000" manufactured by Alltech associates, Inc.)
Data processing: "GPC-8020 Model II data analysis version 4.30" manufactured by Tosoh Corporation
Measurement conditions: Column temperature 40° C.
Developing solvent tetrahydrofuran (THF)
Flow rate 1.0 ml/min
Sample: 1.0% by mass tetrahydrofuran solution (5 μl) in terms of resin solid content prepared by filtration through a microfilter
Standard sample: The following monodisperse polystyrenes having a known molecular weight were used in conformity with the measurement manual of the "GPC-8020 Model II data analysis version 4.30".
(Monodisperse Polystyrenes)
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation
"F-288" manufactured by Tosoh Corporation
"F-550" manufactured by Tosoh Corporation To achieve antifouling properties and compatibility With other components, a curable fluorine-containing resin according to the present invention preferably has a fluorine content in the range of 2% by mass to 50% by mass, more preferably in the range of 5% by mass to 40% by mass, still more preferably in the range of 10% by mass to 35% by mass. Note that the fluorine content of a radical-polymerizable fluorine-containing copolymer according to the present invention is calculated from a mass ratio of fluorine atoms to the total mass of used materials.

A curable fluorine-containing resin according to the present invention itself may be used as a main agent of an active-energy-ray-curable composition. However, since this resin has an excellent surface modification capability, when the resin is used as a fluorine-containing surfactant added to an active-energy-ray-curable composition, excellent antifouling properties can be imparted to the cured coating film.

An active-energy-ray-curable composition according to the present invention contains a curable fluorine-containing resin according to the present invention and, as a main component, an active-energy-ray-curable resin (D) or an active-energy-ray-curable monomer (E). Note that, in an active-energy-ray-curable composition according to the present invention, the active-energy-ray-curable resin (D) and the active-energy-ray-curable monomer (E) may be used alone or in combination. A curable fluorine-containing resin according to the present invention is preferably used as a fluorine-containing surfactant in the active-energy-ray-curable composition.

Examples of the active-energy-ray-curable resin (D) include urethane (meth)acrylate resins, unsaturated polyester resins, epoxy (meth)acrylate resins, polyester (meth)acrylate resins, acrylic (meth)acrylate resins, and resins having a maleimide group. In the present invention, in particular, urethane (meth)acrylate resins are preferred in view of, for example, transparency and low shrinkage.

Such a urethane (meth)acrylate resin used herein may be a resin that has a urethane bond and a (meth)acryloyl group and is obtained by a reaction between an aliphatic polyisocyanate compound or an aromatic polyisocyanate compound and a (meth)acrylate compound having a hydroxy group.

Examples of the aliphatic polyisocyanate compound include tetramethylene diisocyanate, pentamethylene diisocyanate, hexamethylene diisocyanate, heptamethylene diisocyanate, octamethylene diisocyanate, decamethylene diisocyanate, 2-methyl-1,5-pentane diisocyanate, 3-methyl-1,5-pentane diisocyanate, dodecamethylene diisocyanate, 2-methylpentamethylene diisocyanate, 2,2,4-trimethylhexamethylene diisocyanate, 2,4,4-trimethylhexamethylene diisocyanate, isophorone diisocyanate, norbornane diisocyanate, hydrogenated diphenylmethane diisocyanate, hydrogenated tolylene diisocyanate, hydrogenated xylylene diisocyanate, hydrogenated tetramethylxylylene diisocyanate, and cyclohexyl diisocyanate. Examples of the aromatic polyisocyanate compound include tolylene diisocyanate, 4,4'-diphenylmethane diisocyanate, xylylene diisocyanate, 1,5-naphthalene diisocyanate, tolidine diisocyanate, and p-phenylene diisocyanate.

On the other hand, examples of the acrylate compound having a hydroxy group include 2-hydroxyethyl (meth)acrylate, 2-hydroxypropyl (meth)acrylate, 2-hydroxybutyl (meth)acrylate, 4-hydroxybutyl (meth)acrylate, dihydric alcohol mono(meth)acrylates such as 1,5-pentanediol mono(meth)acrylate, 1,6-hexanediol mono(meth)acrylate, neopentyl glycol mono(meth)acrylate, and hydroxypivalate neopentyl glycol mono(meth)acrylate; trihydric alcohol mono/di(meth)acrylates such as trimethylolpropane di(meth)acrylate, ethoxylated trimethylolpropane (meth)acrylate, propoxylated trimethylolpropane di(meth)acrylate, glycerin di(meth)acrylate, and bis(2-(meth)acryloyloxyethyl)hydroxyethylisocyanurate, and mono/di(meth)acrylates having a hydroxy group provided by modifying a part of alcoholic hydroxy groups of the foregoing with ε-caprolactone; compounds having a single hydroxy group and three or more (meth)

acryloyl groups such as pentaerythritol tri(meth)acrylate, ditrimethylolpropane tri(meth)acrylate, and dipentaerythritol penta(meth)acrylate, and polyfunctional (meth)acrylates having a hydroxy group provided by modifying the compounds with ε-caprolactone; (meth)acrylate compounds having an oxyalkylene chain such as dipropylene glycol mono(meth)acrylate, diethylene glycol mono(meth)acrylate, polypropylene glycol mono(meth)acrylate, and polyethylene glycol mono(meth)acrylate; (meth)acrylate compounds having block oxyalkylene chains such as polyethylene glycol-polypropylene glycol mono(meth)acrylate and polyoxybutylene-polyoxypropylene mono(meth)acrylate; and (meth)acrylate compounds having random oxyalkylene chains such as polyethylene glycol-tetramethylene glycol) mono(meth)acrylate and poly(propylene glycol-tetramethylene glycol) mono(meth)acrylate.

The reaction between an aliphatic polyisocyanate compound or an aromatic polyisocyanate compound and an acrylate compound having a hydroxy group can be conducted in a standard manner in the presence of a urethane-forming catalyst. Specific examples of a urethane-forming catalyst usable herein include amines such as pyridine, pyrrole, triethylamine, diethylamine, and dibutylamine; phosphines such as triphenylphosphine and triethylphosphine; organic tin compounds such as dibutyl tin dilaurate, octyl tin trilaurate, octyl tin diacetate, dibutyl tin diacetate, and tin octylate; and organic metal compounds such as zinc octylate.

Of the urethane acrylate resins, in particular, preferred are resins obtained through a reaction between an aliphatic polyisocyanate compound and a (meth)acrylate compound having a hydroxy group because the cured coating films have high transparency and the resins have high sensitivity to active energy rays and high curability.

Next, such an unsaturated polyester resin is a curable resin obtained through polycondensation between an α,β-unsaturated dibasic acid, an acid anhydride thereof, an aromatic saturated dibasic acid, or an acid anhydride thereof, and a glycol. Examples of the α,β-unsaturated dibasic acid or the acid anhydride thereof include maleic acid, maleic anhydride, fumaric acid, itaconic acid, citraconic acid, chloromaleic acid, and esters of the foregoing. Examples of the aromatic saturated dibasic acid or the acid anhydride thereof include phthalic acid, phthalic anhydride, isophthalic acid, terephthalic acid, nitrophthalic acid, tetrahydrophthalic anhydride, endomethylene tetrahydrophthalic anhydride, halogenated phthalic anhydrides, and esters of the foregoing. Examples of an aliphatic or alicyclic saturated dibasic acid include oxalic acid, malonic acid, succinic acid, adipic acid, sebacic acid, azelaic acid, glutaric acid, hexahydrophthalic anhydride, and esters of the foregoing. Examples of the glycol include ethylene glycol, propylene glycol, diethylene glycol, dipropylene glycol, 1,3-butanediol, 1,4-butanediol, 2-methylpropane-1,3-diol, neopentyl glycol, triethylene glycol, tetraethylene glycol, 1,5-pentanediol, 1,6-hexanediol, bisphenol A, hydrogenated bisphenol A, ethylene glycol carbonate, and 2,2-di-(4-hydroxypropoxydiphenyl)propane; and an oxide such as ethylene oxide or propylene oxide may be similarly used.

Next, examples of an epoxy vinyl ester resin include resins obtained through a reaction between (meth)acrylic acid and an epoxy group of an epoxy resin such as a bisphenol A epoxy resin, a bisphenol F epoxy resin, a bisphenol-novolac epoxy resin, or a cresol-novolac epoxy resin.

Examples of the resins having a maleimide group include a bifunctional maleimide urethane compound obtained by urethane formation between N-hydroxyethylmaleimide and isophorone diisocyanate; a bifunctional maleimide ester compound obtained by ester formation between maleimide acetic acid and polytetramethylene glycol; a tetrafunctional maleimide ester compound obtained by ester formation between maleimide caproic acid and a tetraethylene oxide adduct of pentaerythritol; and a polyfunctional maleimide ester compound obtained by ester formation between maleimide acetic acid and a polyhydric alcohol compound. Such active-energy-ray-curable resins (F) may be used alone or in combination of two or more thereof.

Examples of the active-energy-ray-curable monomer (E) include ethylene glycol di(meth)acrylate, diethylene glycol di(meth)acrylate, triethylene glycol di(meth)acrylate, polyethylene glycol di(meth)acrylate having a number-average molecular weight in the range of 150 to 1000, propylene glycol di(meth)acrylate, dipropylene glycol di(meth)acrylate, tripropylene glycol di(meth)acrylate, polypropylene glycol di(meth)acrylate having a number-average molecular weight in the range of 150 to 1000, neopentyl glycol di(meth)acrylate, 1,3-butanediol di(meth)acrylate, 1,4-butanediol di(meth)acrylate, 1,6-hexanediol di(meth)acrylate, hydroxypivalic acid ester neopentyl glycol di(meth)acrylate, bisphenol A di(meth)acrylate, trimethylolpropane tri(meth)acrylate, pentaerythritol tri(meth)acrylate, dipentaerythritol hexa (meth)acrylate, pentaerythritol tetra(meth)acrylate, trimethylolpropane di(meth)acrylate, dipentaerythritol penta (meth)acrylate, dicyclopentenyl (meth)acrylate; aliphatic alkyl (meth)acrylates such as methyl (meth)acrylate, propyl. (meth)acrylate, butyl (meth)acrylate, t-butyl (meth)acrylate, 2-ethylhexyl (meth)acrylate, octyl (meth)acrylate, decyl (meth)acrylate, isodecyl (meth)acrylate, lauryl (meth)acrylate, stearyl (meth)acrylate, and isostearyl (meth)acrylate; glycerol (meth)acrylate, 2-hydroxyethyl (meth)acrylate, 3-chloro-2-hydroxypropyl (meth)acrylate, glycidyl (meth) acrylate, allyl (meth)acrylate, 2-butoxyethyl (meth)acrylate, 2-(diethylamino)ethyl (meth)acrylate, 2-(diethylamino)ethyl (meth)acrylate, γ-(meth)acryloxypropyltrimethoxysilane, 2-methoxyethyl (meth)acrylate, methoxydiethylene glycol (meth)acrylate, methoxydipropylene glycol (meth)acrylate, nonylphenoxypolyethylene glycol (meth)acrylate, nonylphenoxypolypropylene glycol (meth)acrylate, phenoxyethyl (meth)acrylate, phenoxydipropylene glycol (meth)acrylate, phenoxypolypropylene glycol (meth)acrylate, polybutadiene (meth)acrylate, polyethylene glycol-polypropylene glycol (meth)acrylate, polyethylene glycol-polybutylene glycol (meth)acrylate, polystyrylethyl (meth)acrylate, benzyl (meth)acrylate, cyclohexyl (meth)acrylate, dicyclopentanyl (meth)acrylate, dicyclopentenyl (meth)acrylate, isobornyl (meth)acrylate, methoxylated cyclodecatriene (meth)acrylate, phenyl (meth)acrylate; and maleimides such as maleimide, N-methylmaleimide, N-ethylmaleimide, N-propylmaleimide, N-butylmaleimide, N-hexylmaleimide, N-octylmaleimide, N-dodecylmaleimide, N-stearylmaleimide, N-phenylmaleimide, N-cyclohexylmaleimide, 2-maleimideethyl-ethylcarbonate, 2-maleimideethyl-propylcarbonate, N-ethyl-(2-maleimideethyl)carbamate, N,N-hexamethylenebismaleimide, polypropylene glycol-bis(3-maleimidepropyl)ether, bis(2-maleimideethyl) carbonate, and 1,4-dimaleimidecyclohexane.

Of these, in particular, preferred are polyfunctional (meth) acrylates having a functionality of three or more such as trimethylolpropane tri(meth)acrylate, pentaerythritol tri (meth)acrylate, dipentaerythritol hexa(meth)acrylate, and pentaerythritol tetra(meth)acrylate because cured coating films having high hardness are provided. Such active-energy-ray-curable monomers (E) may be used alone or in combination of two or more thereof.

When a curable fluorine-containing resin according to the present invention is used as a fluorine-containing surfactant in an active-energy-ray-curable composition according to the present invention, the amount of the resin used is preferably in the range of 0.01 to 10 parts by mass, more preferably 0.1 to 5 parts by mass, with respect to 100 parts by mass of the total of the active-energy-ray-curable resin (D) and the active-energy-ray-curable monomer (E). When the amount of a curable fluorine-containing resin according to the present invention used is in such a range, sufficiently high leveling properties, water-oil repellency, and antifouling properties can be achieved and the cured composition has sufficiently high hardness and transparency.

By applying a curable fluorine-containing resin or an active-energy-ray-curable composition according to the present invention to a base material and then irradiating the applied resin or composition with an active energy ray, a cured coating film can be formed. The active energy ray denotes an ionizing radiation such as ultraviolet rays, electron beams, α-rays, β-rays, or γ-rays. When such a cured coating film is formed through irradiation with ultraviolet rays serving as an active energy ray, a photopolymerization initiator (F) is preferably added to the curable fluorine-containing resin or the active-energy-ray-curable composition to enhance the curability. If necessary, a photosensitizer may be further added to enhance the curability. On the other hand, when an ionizing radiation such as electron beams, α-rays, β-rays, or γ-rays is used, rapid curing is achieved without use of a photopolymerization initiator or a photosensitizer and hence it is not necessary to add the photopolymerization initiator (F) or a photosensitizer.

The photopolymerization initiator (F) may be an intramolecular-cleavage photopolymerization initiator or a hydrogen-abstraction photopolymerization initiator. Examples of the intramolecular-cleavage photopolymerization initiator include acetophenone-based compounds such as diethoxyacetophenone, 2-hydroxy-2-methyl-1-phenylpropane-1-one, benzyl dimethyl ketal, 1-(4-isopropylphenyl)-2-hydroxy-2-methylpropane-1-one, 4-(2-hydroxyethoxy)phenyl(2-hydroxy-2-propyl)ketone, 1-hydroxycyclohexyl phenyl ketone, 2-methyl-2-morpholino(4-thiomethylphenyl)propane-1-one, and 2-benzyl-2-dimethylamino-1-(4-morpholinophenyl)butanone; benzoins such as benzoin, benzoin methyl ether, and benzoin isopropyl ether; acylphosphine oxide-based compounds such as 2,4,6-trimethylbenzoin diphenylphosphine oxide and bis(2,4,6-trimethylbenzoyl)phenylphosphine oxide; and benzil and methylphenylglyoxy ester.

On the other hand, examples of the hydrogen-abstraction photopolymerization initiator include benzophenone-based compounds such as benzophenone, o-benzoyl methylbenzoate-4-phenylbenzophenone, 4,4'-dichlorobenzophenone, hydroxybenzophenone, 4-benzoyl-4'-methyl-diphenylsulfide, acrylated benzophenone, 3,3',4,4'-tetra(t-butylperoxycarbonyl)benzophenone, and 3,3'-dimethyl-4-methoxybenzophenone; thioxanthone-based compounds such as 2-isopropylthioxanthone, 2,4-dimethylthioxanthone, 2,4-diethylthioxanthone, and 2,4-dichlorothioxanthone; aminobenzophenone-based compounds such as Michler's ketone and 4,4'-diethylaminobenzophenone; 10-butyl-2-chloroacridone, 2-ethylanthraquinone, 9,10-phenanthrenequinone, and camphorquinone.

Of the above-described photopolymerization initiators (F), in view of high compatibility with the active-energy-ray-curable resin (D) and the active-energy-ray-curable monomer (E) in the active-energy-ray-curable composition, 1-hydroxycyclohexyl phenyl ketone and benzophenone are preferred, in particular, 1-hydroxycyclohexyl phenyl ketone is preferred. Such photopolymerization initiators (F) may be used alone or in combination of two or more thereof.

Examples of the photosensitizer include amines such as aliphatic amines and aromatic amines; ureas such as o-tolylthio urea; and sulfur compounds such as sodium diethyldithiophosphate and s-benzylisothiuronium-p-toluenesulfonate.

The amounts of the photopolymerization initiator and the photosensitizer used are each preferably 0.01 to 20 parts by mass, more preferably 0.1 to 15 parts by mass, still more preferably 0.3 to 7 parts by mass with respect to 100 parts by mass of the nonvolatile components in the active-energy-ray-curable composition.

An active-energy-ray-curable composition according to the present invention may be used in combination with various mixing materials in accordance with, for example, an intended application or intended properties, for the purpose of adjusting the viscosity or the refractive index, adjusting the color of the coating film, or adjusting other properties such as properties of the coating material or physical properties of the coating film unless advantages of the present invention are not degraded. Examples of the mixing materials include various organic solvents; various resins such as acrylic resins, phenolic resins, polyester resins, polystyrene resins, urethane resins, urea resins, melamine resins, alkyd resins, epoxy resins, polyamide resins, polycarbonate resins, petroleum resins, and fluorocarbon resins; various organic/inorganic particles such as fine particles of PTFE (polytetrafluoroethylene), polyethylene, polypropylene, carbon, titanium oxide, alumina, copper, and silica; polymerization initiators, polymerization inhibitors, antistatic agents, antifoaming agents, viscosity modifiers, light stabilizers, weathering stabilizers, thermal stabilizers, antioxidants, anticorrosives, slip additives, waxes, luster adjusters, release agents, compatibilizers, conductivity adjusting agents, pigments, dyes, dispersing agents, dispersion stabilizers, silicone surfactants, and hydrocarbon surfactants.

In the above-described mixing components, the organic solvents are advantageous for appropriately adjusting the viscosity of the solution of an active-energy-ray-curable composition according to the present invention and use of such an organic solvent facilitates control of the film thickness in thin-film coating. Examples of the organic solvents usable herein include aromatic hydrocarbons such as toluene and xylene; alcohols such as methanol, ethanol, isopropanol, and t-butanol; esters such as ethyl acetate and propylene glycol monomethyl ether acetate; and ketones such as methyl ethyl ketone, methyl isobutyl ketone, and cyclohexanone. These solvents may be used alone or in combination of two or more thereof.

Although the amount of an organic solvent used varies depending on the application, the intended film thickness, and the intended viscosity, it is preferably 0.5 to 4 times the total mass of curable components on the mass basis.

As described above, an active energy ray for curing an active-energy-ray-curable composition according to the present invention is an ionizing radiation such as ultraviolet rays, electron beams, α-rays, β-rays, or γ-rays. As for specific examples of an energy source or a curing device, ultraviolet rays from a light source such as a germicidal lamp, an ultraviolet fluorescent lamp, carbon arc, a xenon lamp, a high-pressure mercury-vapor lamp for copying, a middle- or high-pressure mercury-vapor lamp, an ultrahigh-pressure mercury-vapor lamp, an electrodeless lamp, a metal halide lamp, or natural light; or electron beams from a scanned electron beam accelerator or an electron-curtain electron beam accelerator may be used.

Of these, in particular, ultraviolet rays are preferably used. To avoid curing inhibition due to oxygen or the like, irradiation with ultraviolet rays is preferably performed under the atmosphere of an inert gas such as nitrogen gas. If necessary, thermal energy may be used as an additional energy source: after curing with ultraviolet rays is performed, a heat treatment may be performed.

A coating process for an active-energy-ray-curable composition according to the present invention varies in accordance with the application. Examples of the coating process include application processes employing a gravure coater, a roll coater, a comma coater, a knife coater, an air knife coater, a curtain coater, a kiss coater, a shower coater, a wheeler coater, a spin coater, dipping, screen printing, spraying, an applicator, and a bar coater; and molding processes employing various molds.

A cured coating film formed from a curable fluorine-containing resin according to the present invention has, for example, high antifouling properties (such as ink repellency and fingerprint resistance) and anti-scratch properties. Accordingly, by applying and curing the resin on the surface of an article, for example, antifouling properties and anti-scratch properties can be imparted to the surface of the article. In addition, by adding a curable fluorine-containing resin according to the present invention as a fluorine-containing surfactant to a coating material, leveling properties can be imparted to the coating material. Accordingly, an active-energy-ray-curable composition according to the present invention has high leveling properties.

Examples of an article to which antifouling properties (such as ink repellency and fingerprint resistance) can be imparted with a curable fluorine-containing resin or an active-energy-ray-curable composition according to the present invention include films for polarizing plates of liquid crystal displays (LCDs) such as TAC films; screens of various'displays such as plasma displays (PDPs) and organic EL displays; touch panels; cases or screens of electronic terminals such as cellular phones; transparent protective films for color filters (hereafter, referred to as "CFs") for liquid crystal displays; organic insulating films for liquid crystal TFT arrays; inkjet inks for forming electronic circuits; optical recording media such as CDs, DVDs, and Blu-ray Discs; transfer films for insert molding (IMD, IMF); rubber rollers for OA equipment such as copying machines and printers; glass plates of scanning parts of OA equipment such as copying machines and scanners; optical lenses for cameras, video cameras, and glasses; windshields and glass plates of clocks and watches such as wristwatches; windows for various vehicles such as automobiles and railway vehicles; cover glasses and films for solar cells; various building materials such as decorative laminated sheets; windowpanes of houses; woodwork materials such as furniture; artificial/synthetic leather; various plastic molded articles such as cases of household electrical appliances; and FRP bathtubs. By applying an active-energy-ray-curable composition according to the present invention to the surface of such an article and irradiating the applied composition with an active energy ray such as ultraviolet rays to form a cured coating film, antifouling properties can be imparted to the surface of the article. By adding a fluorine-containing styrene compound according to the present invention to various coating materials suitable for articles and applying and drying the coating materials, antifouling properties can also be imparted to the surfaces of the articles.

Examples of a coating material to which a curable fluorine-containing resin according to the present invention is added so that the leveling properties are enhanced and the coating film has antifouling properties (such as ink repellency and fingerprint resistance) and chemical resistance include: hard coating materials, anti-glare (AG) coating materials, or low reflectance (LR) coating materials for films for polarizing plates of LCDs such as TAC films; hard coating materials for screens of various displays such as plasma displays and organic EL displays (PDPs); hard coating materials for touch panels; color resists, printing inks, inkjet inks, or coating materials for forming R, G, and B pixels for CFs; black resists, printing inks, inkjet inks, or coating materials for black matrix for CFs; resin compositions for pixel partitions for plasma displays (PDPs) and organic EL displays; coating materials or hard coating materials for cases of electronic terminals such as cellular phones; hard coating materials for screens of cellular phones; coating materials for transparent protective films for protecting the surfaces of CFs; coating materials for organic insulating films for liquid crystal TFT arrays; inkjet inks for forming electronic circuits; hard coating materials for optical recording media such as CDs, DVDs, and Blu-ray Discs; hard coating materials for transfer films for insert molding (IMD, IMF); coating materials for rubber rollers for OA equipment such as copying machines and printers; coating materials for glasses of scanning parts of OA equipment such as copying machines and scanners; coating materials for optical lenses for cameras, video cameras, and glasses; coating materials for windshields and glasses of clocks and watches such as wristwatches; coating materials for windows for various vehicles such as automobiles and railway vehicles; coating materials for antireflection films for cover glasses or films for solar cells; printing inks or coating materials for various building materials such as decorative laminated sheets; coating materials for windowpanes of houses; coating materials for woodwork materials such as furniture; coating materials for artificial/synthetic leather; paints or coating materials for various plastic molded articles such as cases of household electrical appliances; and paints or coating materials for FRP bathtubs.

Other articles to which anti-scratch properties and antifouling properties can be imparted with a curable fluorine-containing resin or an active-energy-ray-curable composition according to the present invention include prism sheets and scattering sheets, which are backlight members of LCDs. By adding a curable fluorine-containing resin according to the present invention to coating materials for prism sheets or scattering sheets, the leveling properties of the coating materials can be enhanced, and anti-scratch properties and antifouling properties can be imparted to coating films formed from the coating materials.

Since a cured coating film formed from a curable fluorine-containing resin according to the present invention has a low refractive index, the resin may also be used as a coating material for low-refractive-index layers in antireflection layers suppressing reflections of fluorescent lamps or the like in the screens of various displays such as LCDs. In addition, by adding a curable fluorine-containing resin according to the present invention to coating materials for antireflection layers, in particular, coating materials for low-refractive-index layers in antireflection layers, the low refractive index of the coating films can be maintained and antifouling properties can be imparted to the surfaces of the coating films.

Examples of other applications in which a curable fluorine-containing resin or an active-energy-ray-curable composition according to the present invention can be used include optical-fiber cladding materials, waveguides, sealing materials for liquid crystal panels, various optical sealing materials, and optical adhesives.

In particular, in the application of a coating material for protective films for polarizing plates for LCDs, when an active-energy-ray-curable composition according to the present invention is used as an anti-glare coating material, among the above-described components, inorganic/organic fine particles such as silica fine particles, acrylic resin fine particles, or polystyrene resin fine particles are preferably mixed in an amount 0.1 to 0.5 times the total mass of the curable components in an active-energy-ray-curable composition according to the present invention because high anti-glare properties are achieved.

When a curable fluorine-containing resin or an active-energy-ray-curable composition according to the present invention is used as an anti-glare coating material for protective films for polarizing plates for LCDs, an imprinting process may be employed in which the coating material to be cured is brought into contact with a mold having surface irregularities and then cured by irradiation with an active energy ray from a side opposite to the mold so that the surface of the coating layer is embossed to achieve anti-glare properties.

EXAMPLES

Hereinafter, the present invention will be described further in detail with reference to specific examples. The methods of measuring the IR spectra and the NMR spectra of obtained compounds having a poly(perfluoroalkylene ether) chain and styryl groups at both ends of the poly(perfluoroalkylene ether) chain and GPC measurement conditions for curable fluorine-containing resins are as follows.

[Method of Measuring IR Spectra]

A measurement apparatus "IRPrestige-21" manufactured by SHIMADZU CORPORATION was used. A very small amount of a sample solution was dropped on a KBr plate and the solvent was dried. After that, the measurement was performed.

[Method of Measuring $^1$H-NMR and $^{13}$C-NMR Spectra]

An acetone-$d_6$ solution of a sample was analyzed with an "AL-400" manufactured by JEOL Ltd. to perform structural analysis of the compound.

[GPC Measurement Conditions]

Measurement apparatus: "HLC-8220 GPC" manufactured by Tosoh Corporation
Columns: guard column "HHR-H" (6.0 mm I.D.×4 cm) manufactured by Tosoh Corporation
+"TSK-GEL GMHHR-N" (7.8 mm I.D.×30 cm) manufactured by Tosoh Corporation
+"TSK-GEL GMHHR-N" (7.8 mm I.D.×30 cm) manufactured by Tosoh Corporation
+"TSK-GEL GMHHR-N" (7.8 mm I.D.×30 cm) manufactured by Tosoh Corporation
+"TSK-GEL GMHHR-N" (7.8 mm I.D.×30 cm) manufactured by Tosoh Corporation
Detector: ELSD ("ELSD2000" manufactured by Alltech associates, Inc.)
Data processing: "GPC-8020 Model II data analysis version 4.30" manufactured by Tosoh Corporation
Measurement conditions: Column temperature 40° C.
  Developing solvent tetrahydrofuran (THF)
  Flow rate 1.0 ml/min
Sample: 1.0% by mass tetrahydrofuran solution (5 μl) in terms of resin solid content prepared by filtration through a microfilter
Standard sample: The following monodisperse polystyrenes having a known molecular weight were used in conformity with the measurement manual of the "GPC-8020 Model II data analysis version 4.30".

(Monodisperse Polystyrenes)
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation
"F-288" manufactured by Tosoh Corporation
"F-550" manufactured by Tosoh Corporation Synthesis Example 1

A glass flask equipped with a stirrer, a thermometer, condenser, and a dropping device was charged with 200 parts by mass of a perfluoropolyether compound having hydroxy groups at both ends and represented by a formula (a2-1-1) below, 123.4 parts by mass of p-chloromethyl styrene, 0.06 parts by mass of p-methoxyphenol, 32.3 parts by mass of a 50% by mass aqueous solution of benzyltriethylammonium chloride, and 1.35 parts by mass of potassium iodide. After that, stirring of the solution was initiated under air flow, the internal temperature of the flask was increased to 45° C., and 9.2 parts by mass of a 49% by mass aqueous solution of sodium hydroxide was dropped over 2 hours. After the dropping was completed, the solution was heated to 60° C. and stirred for an hour. After that, 37.1 parts by mass of a 49% by mass aqueous solution of sodium hydroxide was dropped over 4 hours and the reaction was then allowed to occur for 15 hours.

[Chem. 5]

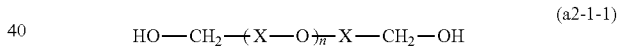

(a2-1-1)

(In the formula, X represents a perfluoromethylene group and a perfluoroethylene group; and a single molecule has, on average, seven perfluoromethylene groups and eight perfluoroethylene groups.)

Figure 2:
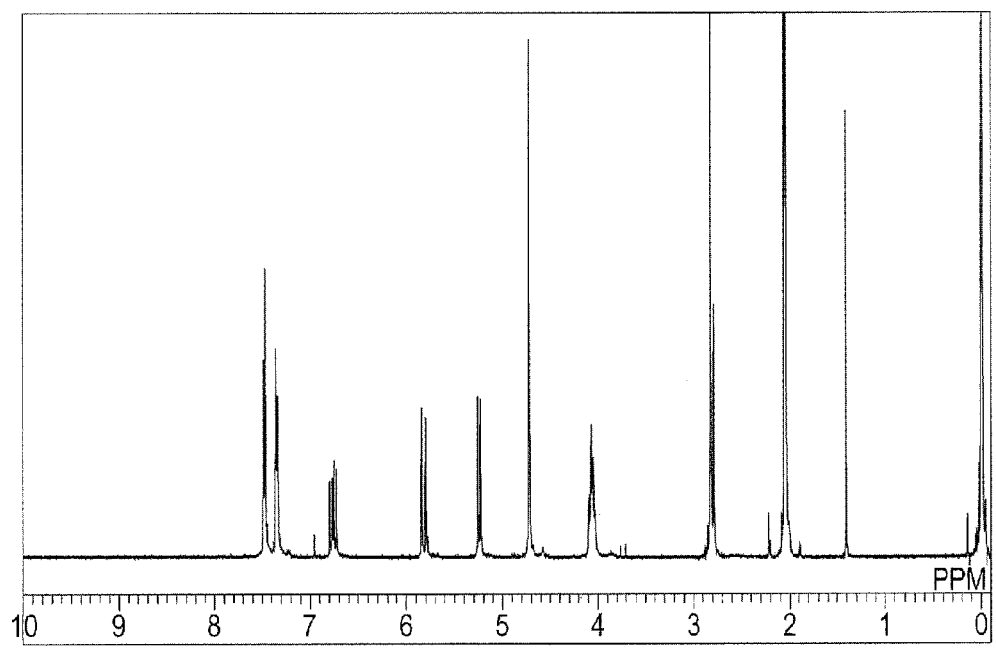
FIG. 2 is a $^1$H-NMR spectrum chart of a compound obtained in Synthesis example 1 and having a poly(perfluoroalkylene ether) chain and styryl groups at both ends of the chain.
Figure 3:
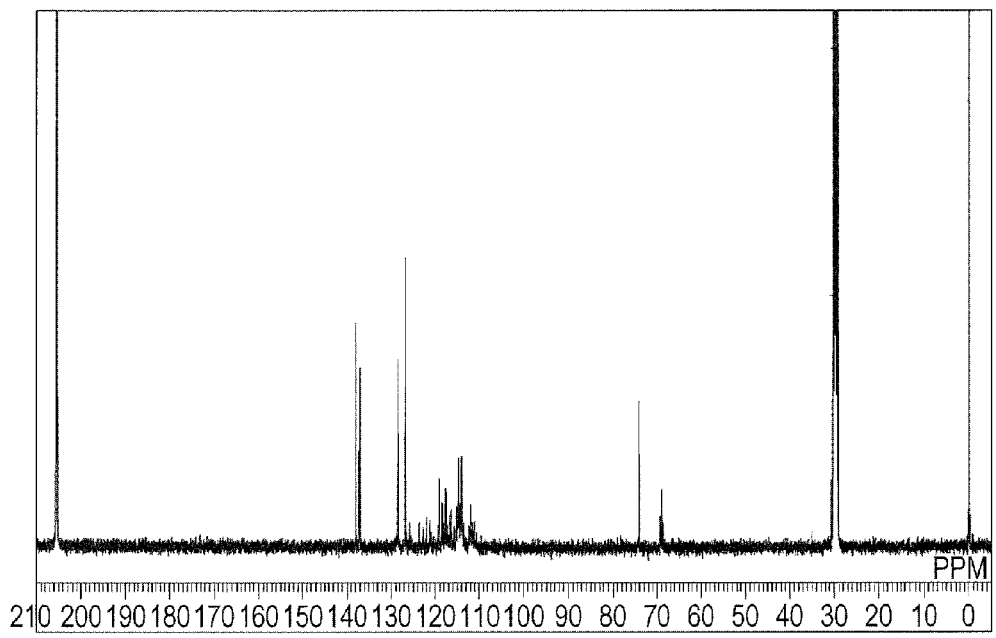
FIG. 3 is a $^{13}$C-NMR spectrum chart of a compound obtained in Synthesis example 1 and having a poly(perfluoroalkylene ether) chain and styryl groups at both ends of the chain.
Figure 4:
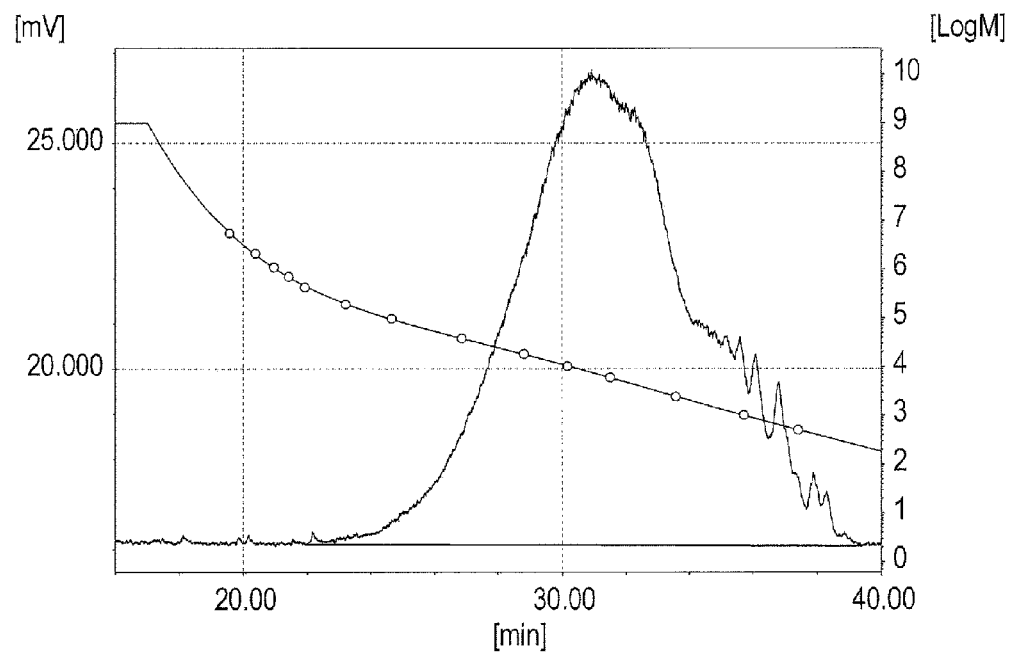
FIG. 4 is a GPC chart of a curable fluorine-containing resin (1) obtained in EXAMPLE 1.
Figure 5:
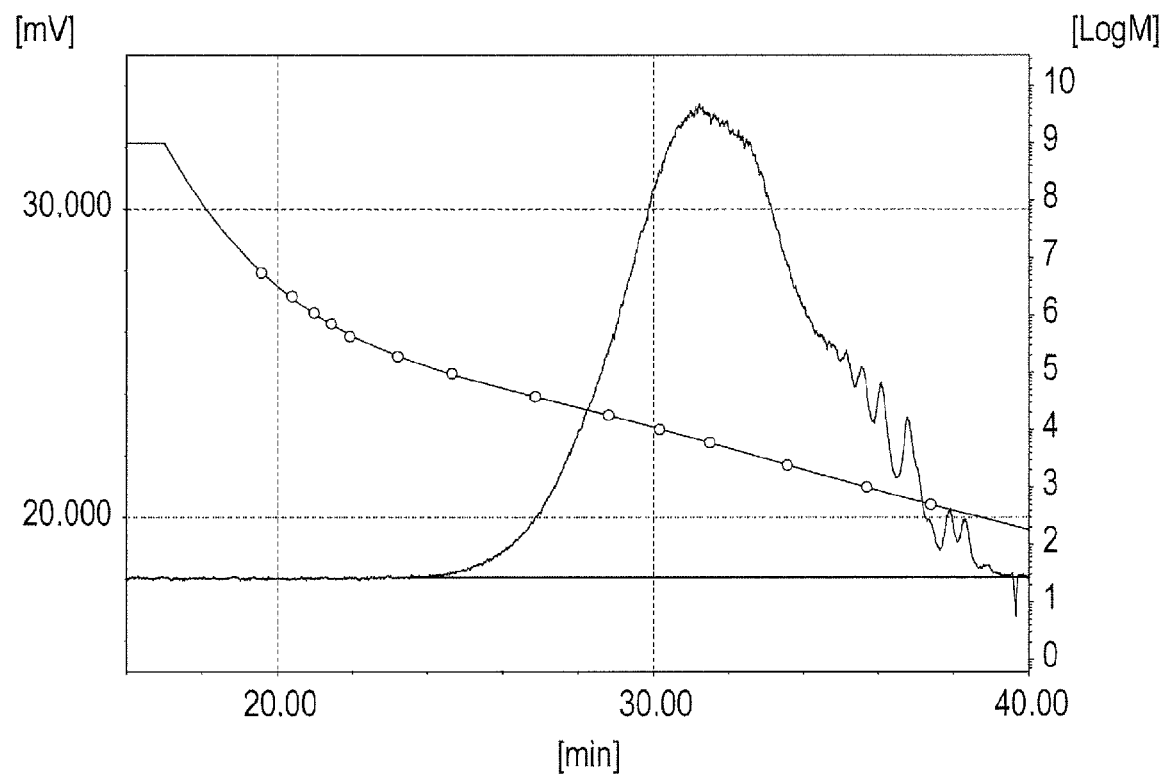
FIG. 5 is a GPC chart of a curable fluorine-containing resin (2) obtained in EXAMPLE 2.

After the reaction was completed, the generated salt was separated by filtration, the filtrate was left to stand, and the supernatant liquor was removed. The resultant solution was washed three times with 500 mL of water. After this washing, the solution was further washed three times with 500 mL of methanol. The solution was then mixed with 0.06 parts by mass of p-methoxyphenol and 0.2 parts by mass of 3,5-t-dibutyl-4-hydroxytoluene (hereafter, abbreviated as "BHT") serving as polymerization inhibitors; and the solution was subsequently concentrated with a water bath set at 45° C. and a rotary evaporator to evaporate methanol. Thus, a compound having a poly(perfluoroalkylene ether) chain and styryl groups at both ends of the chain and represented by a formula (A-1-1) below was obtained (hereafter, abbreviated as "compound (A-1-1)"). IR spectrum measurement indicated that the absorption peak at about 3400 cm$^{-1}$ derived from the hydroxy groups of the perfluoropolyether compound having hydroxy groups at both ends disappeared. The obtained compound (A-1-1) was identified by measurements of $^1$H-NMR and $^{13}$C-NMR spectra. The IR spectrum chart is illustrated in FIG. 1. The $^1$H-NMR spectrum chart is illustrated in FIG. 2. The $^{13}$C-NMR spectrum chart is illustrated in FIG. 3.

[Chem. 6]

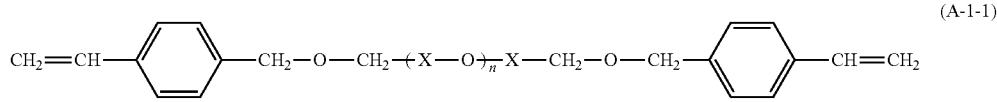
(A-1-1)

(In the formula, X represents a perfluoromethylene group and a perfluoroethylene group; and a single molecule has, on average, seven perfluoromethylene groups and eight perfluoroethylene groups.)

Synthesis Example 2

A glass flask equipped with a stirrer, a thermometer, a condenser, and a dropping device was charged with 150 parts by mass of a perfluoropolyether compound having hydroxy groups at both ends and represented by a formula (a2-1-1) below, 68 parts by mass of p-chloromethyl styrene, 0.05 parts by mass of p-methoxyphenol, 44 parts by mass of a 50% by mass aqueous solution of benzyltriethylammonium chloride, and 0.12 parts by mass of potassium iodide. After that, stirring of the solution was initiated under air flow, the internal temperature of the flask was increased to 45° C., and 1.3 parts by mass of a 49% by mass aqueous solution of sodium hydroxide was dropped over 2 hours. After the dropping was completed, the solution was heated to 60° C. and stirred for an hour. After that, 11.5 parts by mass of a 49% by mass aqueous solution of sodium hydroxide was dropped over 4 hours and the reaction was then allowed to occur for 15 hours.

[Chem. 7]

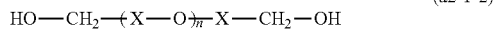
(a2-1-2)

(In the formula, X represents a perfluoromethylene group and a perfluoroethylene group; and a single molecule has, on average, 19 perfluoromethylene groups and 19 perfluoroethylene groups.)

After the reaction was completed, the generated salt was separated by filtration, the filtrate was left to stand, and the supernatant liquor was removed. The resultant solution was washed three times with 500 mL of water. After this washing, the solution was further washed three times with 500 mL of methanol. The solution was then mixed with 0.06 parts by mass of p-methoxyphenol and 0.2 parts by mass of 3,5-t-dibutyl-4-hydroxytoluene (hereafter, abbreviated as "BHT") serving as polymerization inhibitors; and the solution was subsequently concentrated with a water bath set at 45° C. and a rotary evaporator to evaporate methanol. Thus, a compound having a poly(perfluoroalkylene ether) chain and styryl groups at both ends of the chain and represented by a formula (A-1-2) below was obtained (hereafter, abbreviated as "compound (A-1-2)").

[Chem. 8]

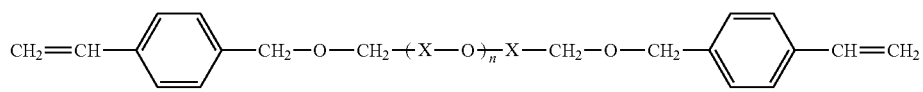
(A-1-2)

(In the formula, X represents a perfluoromethylene group and a perfluoroethylene group; and a single molecule has, on average, 19 perfluoromethylene groups and 19 perfluoroethylene groups.)

Synthesis Example 3

A glass flask equipped with a stirrer, a thermometer, a condenser, and a dropping device was charged with 20 parts by mass of a perfluoropolyether compound having hydroxy groups at both ends and represented by the formula (a2-1-1) above, 20 parts by mass of diisopropyl ether serving as a solvent, 0.02 parts by mass of p-methoxyphenol serving as a polymerization inhibitor, and 3.1 parts by mass of triethylamine serving as a neutralizer. Stirring of the solution was initiated under air flow and, while the internal temperature of the flask was maintained at 10° C., 2.7 parts by mass of acrylic acid chloride was dropped over an hour. After the dropping was completed, the solution was stirred at 10° C. for an hour, heated to 30° C. and stirred for an hour, and then heated to 50° C. and stirred for 10 hours to cause a reaction. Gas chromatography indicated disappearance of acrylic acid chloride. The solution was then mixed with 40 parts by mass of diisopropyl ether serving as a solvent. Subsequently, a washing process was repeated three times in which the solution was mixed with 80 parts by mass of ion-exchanged water, stirred, left to stand to separate an aqueous layer, and the aqueous layer was removed. To the solution, 0.02 parts by mass of p-methoxyphenol serving as a polymerization inhibitor was then added, 8 parts by mass of magnesium sulfate serving as a dehydrating agent was added. The solution was left to stand for a day to be completely dehydrated. The dehydrating agent was then removed by filtration.

The solvent was then evaporated under a reduced pressure. Thus, a compound having a poly(perfluoroalkylene ether) chain and acryloyl groups at both ends of the chain and represented by a formula (A') below was obtained (hereafter, abbreviated as "compound (A')").

[Chem. 9]

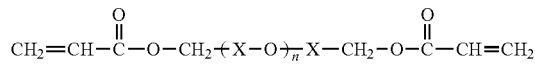
(A')

(In the formula, X represents a perfluoromethylene group and a perfluoroethylene group; and a single molecule has, on average, seven perfluoromethylene groups and eight perfluoroethylene groups.)

Example 1

A glass flask equipped with a stirrer, a thermometer., a condenser, and dropping devices was charged with 80 parts by mass of methyl isobutyl ketone serving as a solvent. This solvent was heated to 105° C. while being stirred under nitrogen flow. Three solutions for dropping were then individually charged into the dropping devices: a monomer solution in which 20 parts by mass of the compound (A-1-1) obtained in Synthesis example 1 was dissolved in 20 parts by mass of methyl isobutyl ketone; a monomer solution in which 38.4 parts by mass of 2-hydroxyethyl methacrylate was dissolved in 38 parts by mass of methyl isobutyl ketone; and a polymerization initiator solution in which 8.8 parts by mass of t-butylperoxy-2-ethylhexanoate serving as a radical polymerization initiator was dissolved in 26 parts by mass of methyl isobutyl ketone. These solutions were simultaneously dropped over 2 hours while the internal temperature of the flask was maintained at 105° C. After the dropping was completed, the solution was stirred at 105° C. for 10 hours and a portion of the solvent was then evaporated under a reduced pressure. Thus, a polymer (P-1) was obtained.

Subsequently, 0.3 parts by mass of p-methoxyphenol serving as a polymerization inhibitor and 0.03 parts by mass of dibutyl tin dilaurate serving as a urethane-forming catalyst were added. Stirring of the solution was initiated under air flow. While the solution was maintained at 60° C., 41.6 parts by mass of 2-acryloyloxyethyl isocyanate was dropped over an hour. After the dropping was completed, the solution was stirred at 60° C. for an hour and then heated to 80° C. and stirred for 10 hours. IR spectrum measurement indicated that the absorption peak at about 2360 cm$^{-1}$ derived from the isocyanate group disappeared. Thus, a methyl isobutyl ketone solution containing 50% by mass of a curable fluorine-containing resin (1) was obtained. The molecular weights of the obtained curable fluorine-containing resin (1) were measured by GPC (molecular weights in terms of polystyrene) and the number-average molecular weight was found to be 2,200 and the weight-average molecular weight was found to be 7,000.

Example 2

A glass flask equipped with a stirrer, a thermometer, a condenser, and dropping devices was charged with 58 parts by mass of methyl isobutyl ketone serving as a solvent. This solvent was heated to 105° C. while being stirred under nitrogen flow. Three solutions for dropping were then individually charged into the dropping devices: a monomer solution in which 36 parts by mass of the compound (A-1-1) obtained in Synthesis example 1 was dissolved in 20 parts by mass of methyl isobutyl ketone; a monomer solution in which 30.7 parts by mass of 2-hydroxyethyl methacrylate was dissolved in 25.7 parts by mass of methyl isobutyl ketone; and a polymerization initiator solution in which 10 parts by mass of t-butylperoxy-2-ethylhexanoate serving as a radical polymerization initiator was dissolved in 20 parts by mass of methyl isobutyl ketone. These solutions were simultaneously dropped over 2 hours while the internal temperature of the flask was maintained at 105° C. After the dropping was completed, the solution was stirred at 105° C. for 10 hours and a portion of the solvent was then evaporated under a reduced pressure. Thus, a polymer (P-2) was obtained.

Subsequently, 0.04 parts by mass of p-methoxyphenol serving as a polymerization inhibitor and 0.03 parts by mass of dibutyl tin dilaurate serving as a urethane-forming catalyst were added. Stirring of the solution was initiated under air flow. While the solution was maintained at 60° C., 33.3 parts by mass of 2-acryloyloxyethyl isocyanate was dropped over an hour. After the dropping was completed, the solution was stirred at 60° C. for an hour and then heated to 80° C. and stirred for 10 hours. IR spectrum measurement indicated that the absorption peak at about 2360 cm$^{-1}$ derived from the isocyanate group disappeared. Thus, a methyl isobutyl ketone solution containing 50% by mass of a curable fluorine-containing resin (2) was obtained. The molecular weights of the obtained curable fluorine-containing resin (2) were measured by GPC (molecular weights in terms of polystyrene) and the number-average molecular weight was found to be 3,200 and the weight-average molecular weight was found to be 14,000.

Example 3

A glass flask equipped with a stirrer, a thermometer, a condenser, and dropping devices was charged with 73.1 parts by mass of 1,3-bis(trifluoromethyl)benzene serving as a solvent. This solvent was heated to 105° C. while being stirred under nitrogen flow. Three solutions for dropping were then individually charged into the dropping devices: 41.8 parts by mass of the monomer (A-1-2) obtained in Synthesis example 2; 80 parts by mass of 2-hydroxyethyl methacrylate; and a polymerization initiator solution in which 18.3 parts by mass of t-butylperoxy-2-ethylhexanoate serving as a radical polymerization initiator was dissolved in 153.1 parts by mass of 1,3-bis(trifluoromethyl)benzene. These solutions were simultaneously dropped over 2 hours while the internal temperature of the flask was maintained at 105° C. After the dropping was completed, the solution was stirred at 105° C. for 10 hours. Thus, a solution of a polymer (P-3) was obtained.

Subsequently, to the solution of the polymer (P-3) obtained above, 0.08 parts by mass of p-methoxyphenol serving as a polymerization inhibitor and 0.06 parts by mass of tin octylate serving as a urethane-forming catalyst were added. Stirring of the solution was initiated under air flow. While the solution was maintained at 60° C., 85 parts by mass of 2-acryloyloxyethyl isocyanate was dropped over an hour. After the dropping was completed, the solution was stirred at 60° C. for an hour and then heated to 80° C. and stirred for 5 hours to cause a reaction. IR spectrum measurement indicated that the absorption peak derived from the isocyanate group disappeared. The solid matter generated in the reaction solution was removed by filtration and a portion of the solvent was then evaporated under a reduced pressure. Thus, a 1,3-bis(trifluoromethyl)benzene solution containing 50% by mass of a polymerizable fluorine-containing resin (3) was obtained. The weight-average molecular weight of the polymerizable fluorine-containing resin (3) was found to be 3,300.

Example 4

A glass flask equipped with a stirrer, a thermometer, a condenser, and dropping devices was charged with 58.5 parts by mass of 1,3-bis(trifluoromethyl)benzene serving as a solvent. This solvent was heated to 105° C. while being stirred under nitrogen flow. Three solutions for dropping were then individually charged into the dropping devices: a mixture of 10 parts by mass of the monomer (A-1-1) obtained in Synthesis example 1 and 10 parts by mass of the monomer (A-1-2) obtained in Synthesis example 2; 38.4 parts by mass of 2-hydroxyethyl methacrylate; and a polymerization initiator solution in which 8.8 parts by mass of t-butylperoxy-2-ethylhexanoate serving as a radical polymerization initiator was dissolved in 50 parts by mass of 1,3-bis(trifluoromethyl)benzene. These solutions were simultaneously dropped over 2 hours while the internal temperature of the flask was maintained at 105° C. After the dropping was completed, the solution was stirred at 105° C. for 10 hours. Thus, a solution of a polymer (P-4) was obtained.

Subsequently, to the solution of the polymer (P-4) obtained above, 0.06 parts by mass of p-methoxyphenol serving as a polymerization inhibitor and 0.05 parts by mass of tin octylate serving as a urethane-forming catalyst were added. Stirring of the solution was initiated under air flow. While the solution was maintained at 60° C., 41.6 parts by mass of 2-acryloyloxyethyl isocyanate was dropped over an hour. After the dropping was completed, the solution was stirred at 60° C. for an hour and then heated to 80° C. and stirred for 5 hours to cause a reaction. IR spectrum measurement indicated that the absorption peak derived from the isocyanate group disappeared. The solid matter generated in the reaction solution was then removed by filtration and a portion of the solvent was subsequently evaporated under a reduced pressure. Thus, a 1,3-bis(trifluoromethyl)benzene solution containing 50% by mass of a polymerizable fluorine-containing resin (4) was obtained. The weight-average molecular weight of the polymerizable fluorine-containing resin (4) was found to be 7,200.

Comparative Example 1

A glass flask equipped with a stirrer, a thermometer, a condenser, and dropping devices was charged with 69 parts by mass of methyl isobutyl ketone serving as a solvent. This solvent was heated to 105° C. while being stirred under nitrogen flow. Two solutions for dropping were then individually charged into the dropping devices: 137.8 parts by mass of a monomer solution in which 40 parts by mass of a fluorinated-alkyl-group-containing acrylate represented by a formula (Y-1) below and 28.8 parts by mass of 2-hydroxyethyl methacrylate were dissolved in 69 parts by mass of methyl isobutyl ketone; and 25.9 parts by mass of a polymerization initiator solution in which 3.4 parts by mass of t-butylperoxy-2-ethylhexanoate serving as a radical polymerization initiator was dissolved in 22.5 parts by mass of methyl isobutyl ketone. These solutions were simultaneously dropped over 3 hours while the internal temperature of the flask was maintained at 105° C. After the dropping was completed, the solution was stirred at 105° C. for 10 hours. Thus, a polymer was obtained.

[Chem. 10]

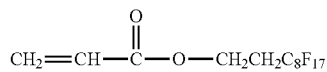

(Y-1)

Subsequently, 0.1 parts by mass of p-methoxyphenol serving as a polymerization inhibitor and 0.05 parts by mass of dibutyl tin dilaurate serving as a urethane-forming catalyst were added. While the solution was maintained at 60° C. under air flow, 31.2 parts by mass of 2-acryloyloxyethyl isocyanate was dropped over an hour. After the dropping was completed, the solution was stirred at 60° C. for an hour and then heated to 80° C. and stirred for 10 hours. IR spectrum measurement indicated that the absorption peak at about 2360 cm$^{-1}$ derived from the isocyanate group disappeared. A portion of the solvent was then evaporated under a reduced pressure and a methyl isobutyl ketone solution containing 50% by mass of a curable fluorine-containing resin (5) was obtained. The molecular weights of the curable fluorine-containing resin (5) were measured by GPC (molecular weights in terms of polystyrene) and the number-average molecular weight was found to be 3,000 and the weight-average molecular weight was found to be 7,000.

Comparative Example 2

A glass flask equipped with a stirrer, a thermometer, a condenser, and dropping devices was charged with 63 parts by mass of methyl isobutyl ketone serving as a solvent. This solvent was heated to 105° C. while being stirred under nitrogen flow. Three solutions for dropping were then individually charged into the dropping devices: 21.5 parts by mass of the compound (A') obtained in Synthesis example 2 and having a poly(perfluoroalkylene ether) chain and acryloyl groups at both ends of the chain; 41.3 parts by mass of 2-hydroxyethyl methacrylate; and 135.4 parts by mass of a polymerization initiator solution in which 9.4 parts by mass of t-butylperoxy-2-ethylhexanoate serving as a radical polymerization initiator was dissolved in 126 parts by mass of methyl isobutyl ketone. These solutions were simultaneously dropped over 2 hours while the internal temperature of the flask was maintained at 105° C. After the dropping was completed, the solution was stirred at 105° C. for 10 hours and a portion of the solvent was then evaporated under a reduced pressure. Thus, a polymer was obtained.

Subsequently, 74.7 parts by mass of methyl ethyl ketone, 0.1 parts by mass of p-methoxyphenol serving as a polymerization inhibitor, and 0.06 parts by mass of dibutyl tin dilaurate serving as a urethane-forming catalyst were added. Stirring of the solution was initiated under air flow. While the solution was maintained at 60° C., 44.8 parts by mass of 2-acryloyloxyethyl isocyanate was dropped over an hour. After the dropping was completed, the solution was stirred at 60° C. for an hour and then heated to 80° C. and stirred for 10 hours. IR spectrum measurement indicated that the absorption peak at about 2360 cm$^{-1}$ derived from the isocyanate group disappeared. Thus, a methyl ethyl ketone solution containing 50% by mass of a curable fluorine-containing resin (6) was obtained. The molecular weights of the obtained curable fluorine-containing resin (6) were measured by GPC (molecular weights in terms of polystyrene) and the number-average molecular weight was found to be 2,400 and the weight-average molecular weight was found to be 7,100.

The curable fluorine-containing resins (1) to (6) obtained in EXAMPLES 1 to 4 and COMPARATIVE EXAMPLES 1 and 2 above are summarized in Table 1 in terms of starting materials, molecular weights, and the like.

TABLE 1

|  |  | Example 1 | Example 2 | Example 3 | Example 4 | Comparative example 1 | Comparative example 2 |
|---|---|---|---|---|---|---|---|
| Type of curable fluorine-containing resin | | Curable fluorine-containing resin (1) | Curable fluorine-containing resin (2) | Curable fluorine-containing resin (3) | Curable fluorine-containing resin (4) | Curable fluorine-containing resin (5) | Curable fluorine-containing resin (6) |
| Starting materials | Compound (A) | A-1-1 | A-1-1 | A-1-2 | A-1-1 A-1-2 | A-1-1 | A' |
| | Monomer (B) | HEMA | HEMA | HEMA | HEMA | HEMA | HEMA |
| | Fluorine-containing monomer | | | | | Y-1 | |
| | Compound (C) | AOI | AOI | AOI | AOI | AOI | AOI |
| Number-average molecular weight (Mn) | | 2,200 | 3,200 | 1,100 | 1,800 | 3,000 | 2,400 |
| Weight-average molecular weight (Mw) | | 7,000 | 14,000 | 3,300 | 7,200 | 7,000 | 7,100 |
| Fluorine content (mass %) | | 11 | 20 | 11 | 11 | 20 | 11 |

Abbreviations in Table 1 are as follows.
HEMA: 2-hydroxyethyl methacrylate
AOI: 2-acryloyloxyethyl isocyanate (Preparation of Base Resin Composition of Active-Energy-Ray-Curable Composition)

A base resin composition of an active-energy-ray-curable composition was obtained by mixing and dissolving 125 parts by mass of an ultraviolet-curable urethane acrylate resin ("UNIDIC 17-806" manufactured by DIC Corporation; butyl acetate solution having 80 mass % resin content) and 5 parts by mass of 1-hydroxycyclohexyl phenyl ketone ("IRGACURE 184" manufactured by Ciba Specialty Chemicals) serving as a photopolymerization initiator in a solvent: 54 parts by mass of toluene, 28 parts by mass of 2-propanol, 28 parts by mass of ethyl acetate, and 28 parts by mass of propylene glycol monomethyl ether.

Examples 5 to 8 and Comparative Examples 3 to 5

To 268 parts by mass of the base resin composition obtained above, the curable fluorine-containing resin solutions (1) to (5) obtained as fluorine-containing surfactants in EXAMPLES 1 and 2 and COMPARATIVE EXAMPLES 1 and 2 were added as a resin content in an amount of 1 part by mass; and the solutions were uniformly mixed to provide active-energy-ray-curable compositions. These active-energy-ray-curable compositions were then applied to polyethylene terephthalate (PET) films having a thickness of 188 μm with a bar coater No. 13. These films were then placed in a dryer at 60° C. for 5 minutes to evaporate the solvent. The dried coating films were then cured by irradiation with ultraviolet rays (UV) with an ultraviolet curing apparatus (under nitrogen atmosphere, high-pressure mercury-vapor lamp, ultraviolet radiation dose: 2 kJ/m$^2$). Thus, coating films serving as EXAMPLES 5 to 8 and COMPARATIVE EXAMPLES 3 and 4 were produced. In addition, the base resin composition of the active-energy-ray-curable composition alone without additional compositions was similarly used to form a coating film serving as COMPARATIVE EXAMPLE 5.

[Evaluations in Terms of Antifouling Properties]

The coating surfaces of the coating films obtained above were evaluated in terms of antifouling properties from the contact angles with water and n-dodecane, anti-adhesion properties for fouling, and the number of times fouling was wiped off as described below.

[Measurement of Contact Angles with Water and N-Dodecane]

The contact angles of the coating surfaces of the coating films in terms of water and n-dodecane were measured with a contact angle meter ("MODEL CA-W150" manufactured by Kyowa Interface Science Co.', Ltd.).

[Evaluation of Anti-Adhesion Properties for Fouling]

Lines were drawn on the coating surfaces of the coating films with a felt-tip pen ("Magic Ink, large, black" or "Magic Ink, large, blue" manufactured by Teranishi Chemical Industry Co., Ltd.). The state of adhesion of the black ink or the blue ink was visually inspected to conduct the evaluation of anti-adhesion properties for fouling. The evaluation system is as follows:

AA: the best antifouling properties, the ink is repelled in the form of droplets A: the ink is repelled in the form of not droplets but lines (the line width is less than 50% of the tip width of the felt-tip pen)

B: the ink is repelled in the form of lines and the line width is 50% or more and less than 100% of the tip width of the felt-tip pen C: the ink is not repelled at all and clear drawing on the surface is achieved.

[Measurement of the Number of Times Fouling was Wiped Off]

After the test in terms of the anti-adhesion properties for fouling was performed, the black ink adhering was completely wiped off with a piece of tissue paper under a load of 1 kg. Subsequently, a process of drawing lines again at the same positions of the coating surfaces of the coating films with the felt-tip pen and completely wiping the adhering ink with a piece of tissue paper, was repeated. The number of times the adhering ink was wiped off with a piece of tissue paper until the surfaces of the coating films no longer repelled the ink was measured as the number of times fouling was wiped off.

[Evaluation of Fouling Wiping Properties]

From the results of the number of times fouling was wiped off measured above, fouling wiping properties were evaluated in accordance with the following evaluation system.

A: the ink was wiped off 5 or more times.
B: the ink was wiped off less than 5 times.
C: the ink was not wiped off even a single time.

[Evaluation in Terms of Antifouling Properties after Alkali Treatment]

The coating films obtained above were immersed in a strong alkali aqueous solution (2 mol/l aqueous solution of potassium hydroxide) at 70° C. for a minute, then rinsed with pure water, dried at 100° C. for 3 minutes, and then left to cool at room temperature. These coating films were also similarly evaluated in terms of the contact angles of the coating surfaces with water and n-dodecane and the anti-adhesion properties for fouling.

The results of the above-described evaluations are described in Table 2.

TABLE 2

| | | Contact angle with water (°) | | Contact angle with n-dodecane (°) | | Anti-adhesion properties for fouling | | | | Fouling wiping properties (Black ink) | |
|---|---|---|---|---|---|---|---|---|---|---|---|
| | | | | | | Black ink | | Blue ink | | The number | |
| | Fluorine-containing surfactant | Before alkali treatment | After alkali treatment | Before alkali treatment | After alkali treatment | Before alkali treatment | After alkali treatment | Before alkali treatment | After alkali treatment | of times fouling was wiped off | Evaluation |
| Example 5 | Curable fluorine-containing resin (1) | 105 | 102 | 55 | 52 | A | B | AA | AA | 6 | A |
| Example 6 | Curable fluorine-containing resin (2) | 106 | 105 | 59 | 55 | AA | A | AA | AA | 6 | A |
| Example 7 | Curable fluorine-containing resin (3) | 106 | 105 | 59 | 55 | AA | A | AA | AA | >20 | A |
| Example 8 | Curable fluorine-containing resin (4) | 106 | 105 | 59 | 55 | AA | A | AA | AA | 10 | A |
| Comparative example 3 | Curable fluorine-containing resin (5) | 98 | 95 | 57 | 52 | AA | C | AA | A | 0 | C |
| Comparative example 4 | Curable fluorine-containing resin (6) | 104 | 98 | 57 | 48 | A | C | AA | AA | 5 | A |
| Comparative example 5 | No addition | 56 | 44 | 12 | 13 | C | C | C | C | 0 | C |

As for the cured coating films formed from the active-energy-ray-curable compositions in EXAMPLES 5 to 8 to which the curable fluorine-containing resins (1) to (4) obtained in EXAMPLES 1 to 4 according to the present invention are added, the following has been found. The contact angles with water and n-dodecane are high and the contact angles do not considerably decrease even after the alkali treatment. The anti-adhesion properties for fouling caused by inks of the felt-tip pens are high in the cases of the black ink and the blue ink. Degradation of the anti-adhesion properties for fouling is also suppressed even after the alkali treatment. Accordingly, the cured coating films have high anti-adhesion properties for any fouling and have stable antifouling properties even after contact with chemical agents such as alkalis. In addition, the cured coating films have high fouling wiping properties; in particular, in Example 6, the number of times fouling was wiped off is more than 20 and the cured coating film has very high fouling wiping properties.

On the other hand, as for COMPARATIVE EXAMPLE 3 employing the curable fluorine-containing resin (5) produced in COMPARATIVE EXAMPLE 1 in which the perfluoroalkyl group is introduced instead of the poly(perfluoroalkylene ether) chain, the following has been found. The contact angle with water is less than 100° and the water repellency is insufficient. The anti-adhesion properties for fouling are good for the blue ink; however, there is a problem that the anti-adhesion properties for fouling are considerably degraded after the alkali treatment for the black ink. In addition, the fouling wiping properties are poor and it is difficult to wipe off fouling plural times.

As for COMPARATIVE EXAMPLE 4 employing the curable fluorine-containing resin (6) produced in COMPARATIVE EXAMPLE 2 in which the compound having acryloyl groups at both ends of the poly(perfluoroalkylene ether) chain is used as a starting material, the following has been found. The contact angles with water and n-dodecane are high; however, there is a problem that the contact angles considerably decrease after alkali treatment. The anti-adhesion properties for fouling are good for the blue ink; however, the anti-adhesion properties for fouling are considerably degraded after the alkali treatment for the black ink.

As for COMPARATIVE EXAMPLE 5 in which no additives are added, it has been found that the contact angles with water and n-dodecane are low and the anti-adhesion properties for fouling and the fouling wiping properties are poor.

The invention claimed is:

1. A curable fluorine-containing resin produced by causing a reaction between a polymer (P) and a compound (C); the polymer (P) being prepared by copolymerization in which essential monomer components are a compound (A) having a following structure:

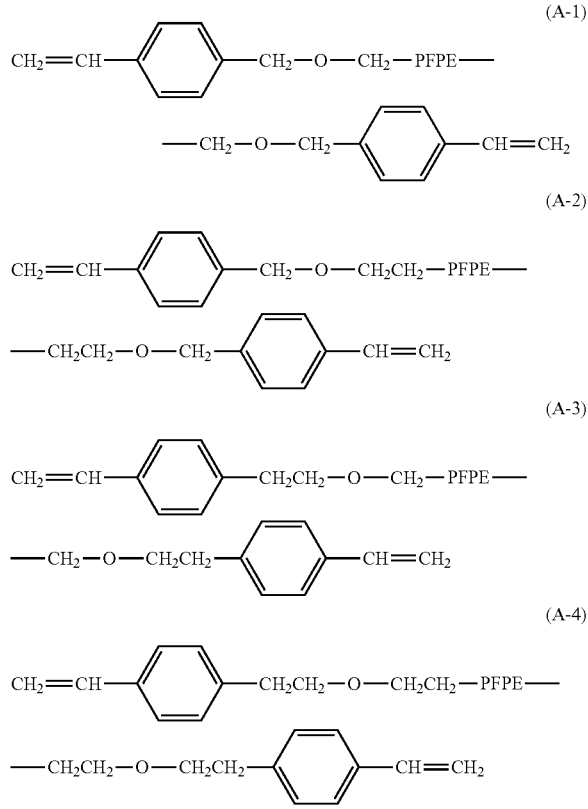

and a polymerizable unsaturated monomer (B) having at least one functional group (b) selected from the group consisting of a hydroxy group, an isocyanate group, an epoxy group, a carboxyl group, an acid anhydride group, and a carboxylic acid halide group; the compound (C) having a polymerizable unsaturated group and at least one functional group (c) that has reactivity with the functional group (b) and is selected from the group consisting of a hydroxy group, an isocyanate group, an epoxy group, a carboxyl group, an acid anhydride group, and a carboxylic acid halide group.

2. An active-energy-ray-curable composition comprising the curable fluorine-containing resin according to claim 1 and an active-energy-ray-curable resin (D) or an active-energy-ray-curable monomer (E).

3. A cured product produced by applying the curable fluorine-containing resin according to claim 1 to a base material and curing the applied resin or composition through irradiation with an active energy ray.

4. An article comprising a cured coating film formed from the curable fluorine-containing resin according to claim 1.

5. A cured product produced by applying the active-energy-ray-curable composition according to claim 2 to a base material and curing the applied resin or composition through irradiation with an active energy ray.

6. An article comprising a cured coating film formed from the active-energy-ray-curable composition according to claim 2.

* * * * *